(12) United States Patent
Klemes et al.

(10) Patent No.: US 11,088,752 B1
(45) Date of Patent: Aug. 10, 2021

(54) MOBILE PSEUDO-DOPPLER OAM RADIO DOWNLINK SYSTEM

(71) Applicant: HUAWEI TECHNOLOGIES CO., LTD., Guangdong (CN)

(72) Inventors: Marek Klemes, Kanata (CA); Wen Tong, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/887,920

(22) Filed: May 29, 2020

(51) Int. Cl.
  *H04B 7/02* (2018.01)
  *H04B 7/08* (2006.01)
  *H04W 16/28* (2009.01)

(52) U.S. Cl.
  CPC .......... *H04B 7/0805* (2013.01); *H04W 16/28* (2013.01)

(58) Field of Classification Search
  CPC .............................. H04B 7/0805; H04W 16/28
  USPC .................................................. 375/260, 267
  See application file for complete search history.

(56) References Cited

U.S. PATENT DOCUMENTS

| 8,306,168 | B2 * | 11/2012 | Lindenmeier | .......... | H04B 7/084 |
| | | | | | 375/347 |
| 9,768,503 | B2 | 9/2017 | Klemes | | |
| 2015/0349910 | A1 * | 12/2015 | Huang | .................... | H04J 14/00 |
| | | | | | 398/44 |
| 2016/0226570 | A1 * | 8/2016 | Nicholls | .............. | H04B 7/0897 |
| 2020/0127709 | A1 * | 4/2020 | Klemes | .................... | H01P 5/227 |

OTHER PUBLICATIONS

Allen, B. et al., Wireless data encoding and decoding using OAM modes, Electronics Letters, vol. 50, No. 3, pp. 232-233, Jan. 30, 2014.
Cano, E et al., Multiple-antenna phase-gradiant detection for OAM radio communications, Electronics Letters, vol. 51, No. 9, pp. 724-725, Apr. 30, 2015.
Chen, J. et al., High-sensitivity OAM phase gradient detection based on time-modulated harmonic characteristic analysis, Electronics Letters, vol. 53, No. 12, pp. 812-814, Jun. 8, 2017.
(Continued)

*Primary Examiner* — Don N Vo
(74) *Attorney, Agent, or Firm* — BCF LLP

(57) ABSTRACT

The disclosed systems, structures, and methods are directed to an orbital angular momentum (OAM) receiver. The OAM receiver comprising at least three receiver antenna elements configured to receive radiated OAM-RF waves and generate antenna element output signals, a selection-antenna switch operative to receive and switch between a second receiver antenna element $RX_{2a}$ output and a third receiver antenna element output $RX_{2b}$, a phase adjusting unit configured to adjust a phase of the output of the selection-antenna switch, a hybrid coupler configured to provide a proportional summation and difference of the two modulated signals, a switching unit configured to limit the coupler output signal to gating time-intervals during which fractional pseudo-Doppler frequency shifts occur, an orthogonal filter bank configured to generate a vector X(t) containing shifted low-frequency values associated with all of the K OAM modes, and an adaptive unit configured to facilitate separation of the OAM-RF waves.

30 Claims, 15 Drawing Sheets

(56) References Cited

OTHER PUBLICATIONS

Drysdale, T. et al., Discretely-sampled partial aperture receiver for orbital angular momentum modes, IEEE, pp. 1431-1432, 2017.

Drysdale, T. et al., Sinusoidal time-modulated uniform circular array for generating orbital angular momentum modes, 11th European Conference on Antennas and Propagation, IEEE, pp. 973-977, 2017.

Hu, Y. et al., Simulation of orbital angular momentum radio communication systems based on partial aperture sampling receiving scheme, IET Microw. Antennas Propag., vol. 16, Iss. 10, pp. 1043-1047, 2016.

Klemes, M., Reception of OAM radio waves using pseudo-doppler interpolation techniques, Jul. 31, 2018.

NTT, NTT successfllu demonstrates 100 Gbps wireless transmission using a new principle (OAM multiplexing) as a world's first—New groundbreaking technology for achieving next generation of 5G systems, May 15, 2018.

Padgett, M.J., Orbital angular momentum 25 years on, Optics Express, vol. 25, No. 10, pp. 11265-11274, May 15, 2017.

Tennant, A. et al., Generation of OAM radio waves using circular time-switched array antenna, Electronics Letters, vol. 48, No. 21, Oct. 11, 2012.

Zhang, C. et al., Millimetre wave with rotational orbital angular momentum, Scienctific Reports, Sep. 6, 2016.

Zhang, C. et al., Detecting the orbital angular momentum of electro-magnetic waves using virtual rotational antenna, Scientific Reports, Jul. 4, 2017.

\* cited by examiner

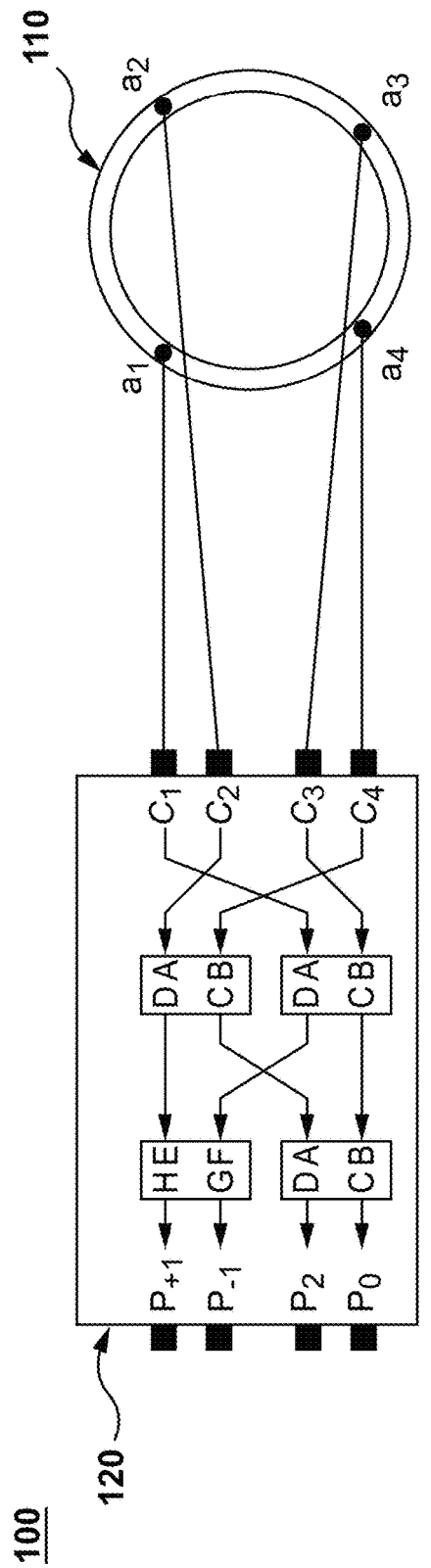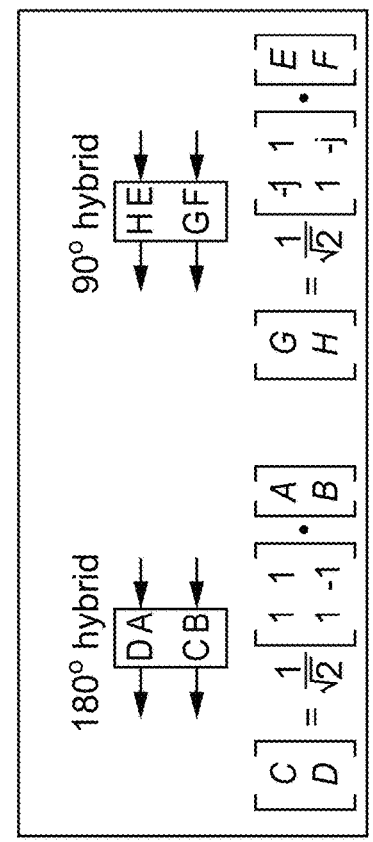
FIG. 1 (PRIOR ART)

$$\mathbf{X}_{M\times 1}(t) = \mathbf{U}_{M\times K}\mathbf{S}_{K\times K}(t)\mathbf{A}_{K\times 1}$$

$$\mathbf{R}_{K\times 1}(t) = \mathbf{S}_{K\times K}(t)\mathbf{A}_{K\times 1} \quad \mathbf{Y}_{K\times 1}(t) = \mathbf{C}_{K\times M}\mathbf{X}_{M\times 1}(t)$$

$$\left.\begin{array}{l}\mathbf{E}_{K\times 1}(t) = \mathbf{Y}_{K\times 1}(t) - \mathbf{R}_{K\times 1}(t)\\ \tau\dfrac{d}{dt}\mathbf{C}_{K\times M}(t) + \alpha\mathbf{C}_{K\times M} = -\mathbf{E}_{K\times 1}(t)\mathbf{X}_{1\times M}^{H}(t)\end{array}\right\} \begin{array}{c}LMS\\ algorithm\end{array}$$

$$\tau\dfrac{d}{dt}\mathbf{C}(t) = -\mathbf{CUS}(t)\mathbf{AA}^{H}\mathbf{S}^{H}(t)\mathbf{U}^{H} - \alpha\mathbf{C} + \mathbf{S}(t)\mathbf{AA}^{H}\mathbf{S}^{H}(t)\mathbf{U}^{H}$$

$$\overline{\mathbf{S}(t)\mathbf{AA}^{H}\mathbf{S}^{H}}(t) = \mathbf{P}_{K\times K} \text{ is \_ diagonal},$$

$$\mathbf{CUPU}^{H} + \mathbf{C}[\alpha\mathbf{I}] - \mathbf{PU}^{H} = -\tau\dfrac{d}{dt}\mathbf{C}(t) \longrightarrow 0$$

$$\mathbf{C}[\mathbf{UPU}^{H} + \alpha\mathbf{I}] = \mathbf{PU}^{H}, \alpha \ll p_{k,\min}$$

$$\mathbf{C} = \mathbf{PU}^{H}[\mathbf{UPU}^{H} + \alpha\mathbf{I}]^{-1}$$

$$\lim_{\alpha \to 0} \mathbf{C} = \mathbf{PU}^{H}[\mathbf{UPU}^{H}]^{\#} = \mathbf{PU}^{H}[\mathbf{U}^{H}]^{\#}\mathbf{P}^{-1}\mathbf{U}^{\#}$$

$$\mathbf{C} = \mathbf{PP}^{-1}\mathbf{U}^{\#}$$

$$\boxed{\mathbf{C} = \mathbf{U}^{\#} = [\mathbf{U}^{H}\mathbf{U}]^{-1}\mathbf{U}^{H}}$$

FIG. 8

| Absolute Constants: | | | Units: | |
|---|---|---|---|---|
| Speed of Light In Free Space | c = | 3.00E+08 | m/s | |
| Pie | π = | 3.1415926 | 1 | |
| | | | | |
| Desired (Down-)Link Parameters: | | | | |
| Signal Bandwidth | B = | 20 | MHz | LTE channel |
| Link Distance | L = | 200 | m | To small-cell mobile |
| Number of OAM Modes (use 8 feed probes) | K = | 5 | 1 | k = 0, ±1, ±2 (8 AIP's?) |
| Separation of RX Antennas | d = | 20 | cm | Max size of UE |
| Pseudo-Doppler Modulation Frequency | F = | 1 | GHz | Max practical for >=K harmonics |
| | | | | |
| Dependent Parameters: | | | | |
| Maximum Radius of OAM Beam Footprint | R = | 5 | m | R<Fd/(2B) |
| RF Carrier Wavelength | λ = | | m | λ=c/f |
| TX Antenna Radius (without lens) | r = | | m | r ~ (K-1)λL/(4πR) |
| TX Far Field Distance | L$_{far,TX}$ = | | m | 2(2r)²/λ |
| RX Far Field Distance | L$_{far,RX}$ = | | m | 2d²/λ |
| Maximum No. of TX Elements | N = | 240.00 | 1 | 2(k+1)L/R |
| Maximum Data Rate Using 64QAM | D = | 600.00 | Mbps | K*log2(64)*B |

EXAMPLE PARAMETERS OF OUTDOOR MOBILE OAM RADIO LINK

| RF Frequency Band (GHz) | | | | | | | | |
|---|---|---|---|---|---|---|---|---|
| | 3.5 | 6 | 28 | 39 | 60 | 73 | 86 | |
| λ = | 0.086 | 0.050 | 0.011 | 0.008 | 0.005 | 0.004 | 0.003 | |
| r = | 1.637 | 0.955 | 0.205 | 0.147 | 0.095 | 0.078 | 0.067 | |
| L$_{far,TX}$ = | 250.119 | 145.903 | 31.265 | 22.447 | 14.590 | 11.992 | 10.179 | |
| L$_{far,RX}$ = | 0.933 | 1.600 | 7.467 | 10.400 | 16.000 | 19.467 | 22.933 | |

Link distance does not exceed far-field distance

FIG. 12

MOBILE PSEUDO-DOPPLER OAM RADIO DOWNLINK SYSTEM

CROSS-REFERENCE TO RELATED APPLICATIONS

This is the first application filed for the instantly disclosed technology.

FIELD OF THE INVENTION

The present invention generally relates to the field of radio-frequency (RF) communications, in particular, to systems and methods directed to applying pseudo-Doppler techniques to enhance the processing accuracy of orbital angular momentum (OAM)-based RF communications received by a mobile station (MS).

BACKGROUND

In view of the proliferation of wireless communication usage, numerous proposals have been presented regarding the improvement of service facilities for existing wireless communication systems as well as for next-generation wireless communication systems. Many of the proposed improvements call for the enhanced capabilities and increased implementation of multiple-input, multiple-output (MIMO) and massive-MIMO (M-MIMO) receiver systems.

To this end, orbital angular momentum (OAM)-based radio-frequency (RF) signals offer an additional spatial dimension, with its additional degrees of freedom, which can be exploited to enhance the capacity of wireless communication links by providing multiple OAM beams on the same frequency channel. However, conventional implementations of OAM-based RF communications have demonstrated certain deficiencies with regard to the effective recovery of OAM signals at far-field distances. These deficiencies may be exacerbated when the receiver is not stationary, such as, for example, a moving mobile station (MS).

SUMMARY

An object of the present disclosure is to provide an orbital angular momentum (OAM) receiver system. The disclosed system comprising at least three receiver antenna elements configured to receive radiated OAM-RF waves and generate antenna element output signals based on the received OAM-RF waves, wherein the at least three receiver antenna elements comprising a first receiver antenna element $RX_1$, a second receiver antenna element $RX_{2a}$ and a third receiver antenna element $RX_{2b}$, the first receiver antenna element $RX_1$ and the second receiver antenna element $RX_{2a}$ are spatially separated by a distance $d_a$ and the first receiver antenna element $RX_1$ and the third receiver antenna element $RX_{2b}$ are spatially separated by a distance $d_b$, the radiated OAM-RF waves containing superposed order modes in which each of the order modes is denoted by integer k and a total number of superposed modes is denoted by integer K, wherein each of the K modes encompasses an individual stream of information data symbols, a selection-antenna switch operative to receive and switch between the second receiver antenna element $RX_{2a}$ output and the third receiver antenna element output $RX_{2b}$ in accordance with an antenna element control signal, a phase adjusting unit configured to adjust a phase of the output of the selection-antenna switch in accordance with a phase corrective information signal, a first modulator configured to modulate the first receiver antenna element $RX_1$ output in accordance with a first high-rate periodic waveform of frequency F generated by a variable frequency oscillator in accordance with a frequency information signal and a second modulator configured to modulate the output of the phase adjusting unit in accordance with a second high-rate periodic waveform of frequency F, a hybrid coupler configured to provide a proportional summation of the two modulated signals, as coupler output signal $Z_1$, and a proportional difference of the two modulated signals, as coupler output signal $Z_2$, a switching unit configured to limit the coupler output signal $Z_1$ or $Z_2$ or a combination of the two to gating time-intervals during which fractional pseudo-Doppler frequency shifts occur, an orthogonal filter bank configured to generate a vector X(t) containing shifted low-frequency values associated with all of the K OAM modes, and an adaptive unit configured to facilitate separation of the OAM-RF waves encompassing the streams of information data symbols in accordance with gated switching unit output signals.

In accordance with other aspects of the present disclosure, the OAM receiver system, wherein the frequency F of the high-rate periodic waveform satisfies the relationship: F>2BR/d, where B is the bandwidth of the received OAM signals, R is the radius of the OAM signals and d is either the distance $d_a$ or the distance $d_b$ depending on which receiver antenna element is selected by the selection-antenna switch.

In accordance with other aspects of the present disclosure, the OAM receiver system, further comprises passing the modulated, time-gated antenna element output signals through the orthogonal filter bank.

In accordance with other aspects of the present disclosure, the OAM receiver system, wherein the orthogonal filter bank further comprises a buffer block configured to store $N_{FFT}$ samples of the modulated, time-gated antenna elements output signals, a number of the samples being denoted with integer $N_{FFT}$, generate the vector X(t) of the $N_{FFT}$ samples of the modulated, time-gated antenna elements output signals.

In accordance with other aspects of the present disclosure, the OAM receiver system, further comprising applying a time window to the vector of the $N_{FFT}$ samples of the modulated, time-gated antenna elements output signals to generate a time window output, and applying a Fast-Fourier-Transform (FFT) to the time window output at an FFT block.

In accordance with other aspects of the present disclosure, the OAM receiver system, further comprising shifting spectral outputs of the FFT block by modulating the output signals of the FFT block with the high-rate periodic waveform of frequency F to generate baseband signals, and further multiplying the baseband signals by adapted weighting coefficients and summing up to provide separate k-th OAM mode baseband signals.

In accordance with other aspects of the present disclosure, the OAM receiver system, wherein the adapted weighting coefficients are generated in accordance with one of the following algorithms: LMS algorithm, Recursive Least Squares (RLS) algorithm, Newton-LMS algorithm, Jutten-Herault network.

In accordance with other aspects of the present disclosure, the OAM receiver system, further comprising generating adapted weighting coefficients by determining an error signal by subtracting the separate k-th OAM mode baseband signals from a reference signal received on the first receiver antenna element $RX_1$ and multiplying the error signal by the spectral outputs of the FFT block.

In accordance with other aspects of the present disclosure, the OAM receiver system, wherein the adaptive unit is configured to generate an asymmetry parameter associated with each k-th OAM mode signal.

In accordance with other aspects of the present disclosure, the OAM receiver system, further comprises a parameter analyzer configured to analyze the asymmetry parameter and mobility parameters associated with the OAM receiver system and generate controlling signals In accordance with other aspects of the present disclosure, the OAM receiver system, further comprises a controller configured to generate one or more of: the antenna element control signal in accordance the controlling signals associated with the mobility parameters, the phase corrective information signal in accordance the controlling signals associated with phases of the received radiated OAM-RF waves, and the frequency information signal in accordance the controlling signals associated with the asymmetry parameter.

In accordance with other aspects of the present disclosure, the OAM receiver system, further comprises a synchronous time-gating unit that is controlled by the high-rate periodic waveform of frequency F.

In accordance with other aspects of the present disclosure, the OAM receiver system, wherein the received radiated OAM-RF waves have been generated in a beam steering manner.

In accordance with other aspects of the present disclosure, the OAM receiver system, wherein, if the first high-rate periodic waveform is increasing in amplitude then the second high-rate periodic waveform other is simultaneously decreasing in amplitude during gating time-intervals, and if the second high-rate periodic waveform is increasing in amplitude then the first high-rate periodic waveform other is simultaneously decreasing in amplitude during gating time-intervals.

In accordance with other aspects of the present disclosure, the OAM receiver system, wherein the first high-rate periodic waveform and the second are real valued cosine waveform and real valued sine waveforms respectively.

Another object of the present disclosure is to provide a method for, processing orbital angular momentum (OAM) signals, comprising receiving, by at least three receiver antenna elements, radiated OAM-RF waves and generating antenna element output signals based on the received OAM-RF waves, wherein the at least three receiver antenna elements comprising a first receiver antenna element $RX_1$, a second receiver antenna element $RX_{2a}$ and a third antenna element $RX_{2b}$, the first receiver antenna element $RX_1$ and the second receiver antenna element $RX_{2a}$ are spatially separated by a distance $d_a$ and the first receiver antenna element $RX_1$ and the third receiver antenna element $RX_{2b}$ are spatially separated by a distance $d_b$, the radiated OAM-RF waves containing superposed order modes in which each of the order modes is denoted by integer k and a total number of superposed modes is denoted by integer K, wherein each of the K modes encompasses an individual stream of information data symbols, receiving and switching, by a selection-antenna switch, between the second receiver antenna element $RX_{2a}$ output and the third receiver antenna element $RX_{2b}$ output in accordance with an antenna element control signal, adjusting a phase, by a phase adjusting unit, of the output of the selection-antenna switch in accordance with a phase corrective information signal, modulating, by a first modulator, the first receiver antenna element $RX_1$ output in accordance with a first high-rate periodic waveform of frequency F generated by a variable frequency oscillator in accordance with a frequency information signal and modulating, by a second modulator, the output of the phase adjusting unit in accordance with a second high-rate periodic waveform of frequency F, providing, by a hybrid coupler, a proportional summation of the two modulated signals, as coupler output signal $Z_1$, and a proportional difference of the two modulated signals, as coupler output signal $Z_2$, limiting, by a switching unit, the coupler output signal $Z_1$ or $Z_2$ or a combination of the two to gating time-intervals during which a fractional pseudo-Doppler frequency shift occur, generating, by an orthogonal filter bank, a vector X(t) containing shifted low-frequency values associated with all of the K OAM modes, and separating, by an adaptive unit the OAM-RF waves encompassing the streams of information data symbols in accordance with gated switching unit output signals.

In accordance with other aspects of the present disclosure, the method, wherein the frequency F of the high-rate periodic waveform satisfies the relationship: F>2BR/d, where B is the bandwidth of the received OAM signals, R is the radius of the OAM signals and d is either the distance $d_a$ or the distance $d_b$ depending on which receiver antenna element is selected by the selection-antenna switch.

In accordance with other aspects of the present disclosure, the method, further comprises passing the modulated, time-gated antenna element output signals through the orthogonal filter bank.

In accordance with other aspects of the present disclosure, the method, wherein the orthogonal filter bank further comprises a buffer block is configured to: store $N_{FFT}$ samples of the modulated, time-gated antenna element output signals, a number of the samples being denoted with integer $N_{FFT}$, generate the vector X(t) of the $N_{FFT}$ samples of the modulated, time-gated antenna element output signals.

In accordance with other aspects of the present disclosure, the method, further comprising: applying a time window to the vector of the $N_{FFT}$ samples of the modulated, time-gated antenna element output signals to generate a time window output, and applying a Fast-Fourier-Transform (FFT) to the time window output at an FFT block.

In accordance with other aspects of the present disclosure, the method, further comprising: shifting spectral outputs of the FFT block by modulating the output signals of the FFT block with the high-rate periodic waveforms of frequencies equal to integer multiples of F to generate baseband signals, and further multiplying the baseband signals by adapted weighting coefficients and summing up to provide separate k-th OAM mode baseband signals.

In accordance with other aspects of the present disclosure, the method, wherein the adapted weighting coefficients are generated in accordance with one of the following algorithms: LMS algorithm, Recursive Least Squares (RLS) algorithm, Newton-LMS algorithm, Jutten-Herault network.

In accordance with other aspects of the present disclosure, the method, further comprising generating adapted weighting coefficients by determining an error signal by subtracting the separate k-th OAM mode baseband signals from a reference signal received on the first receiver antenna element $RX_1$ and multiplying the error signal by the spectral outputs of the FFT block.

In accordance with other aspects of the present disclosure, the method, wherein the adaptive unit is configured to generate an asymmetry parameter associated with each k-th OAM mode signal.

In accordance with other aspects of the present disclosure, the method, further comprises a parameter analyzer configured to analyze the asymmetry parameter and mobility parameters associated with the OAM receiver system and generate controlling signals.

In accordance with other aspects of the present disclosure, the method, further comprises a controller configured to generate one or more of: the antenna element control signal in accordance the controlling signals associated with the mobility parameters, the phase corrective information signal in accordance the controlling signals associated with phases of the received radiated OAM-RF waves, and the frequency information signal in accordance the controlling signals associated with the asymmetry parameter.

In accordance with other aspects of the present disclosure, the method, further comprises a synchronous time-gating unit that is controlled by the high-rate periodic waveform of frequency F.

In accordance with other aspects of the present disclosure, the method, wherein the received radiated OAM-RF waves have been generated in a beam steering manner.

In accordance with other aspects of the present disclosure, the method, wherein if the first high-rate periodic waveform is increasing in amplitude then the second high-rate periodic waveform other is simultaneously decreasing in amplitude during gating time-intervals, and if the second high-rate periodic waveform is increasing in amplitude then the first high-rate periodic waveform other is simultaneously decreasing in amplitude during gating time-intervals.

In accordance with other aspects of the present disclosure, the method, wherein the first high-rate periodic waveform and the second high-rate waveform of frequency F are real valued cosine waveform and real valued sine waveforms respectively.

In accordance with other aspects of the present disclosure, the method,

BRIEF DESCRIPTION OF THE FIGURES

The features and advantages of the present disclosure will become apparent from the following detailed description, taken in combination with the appended drawings, in which:

FIG. 1 depicts a high-level functional block diagram of a conventional orbital angular momentum (OAM) radio-frequency (RF) generating system;

FIG. 8 summarizes the mathematical bases that support the resolution of matrix coefficient values for all K OAM modes and all ±M/2 frequency shifts, in accordance with various embodiments of present disclosure;

FIG. 12 depicts a listing of representative parameters for a mobile OAM downlink, in accordance with the various embodiments of the present disclosure;

Figure 2:
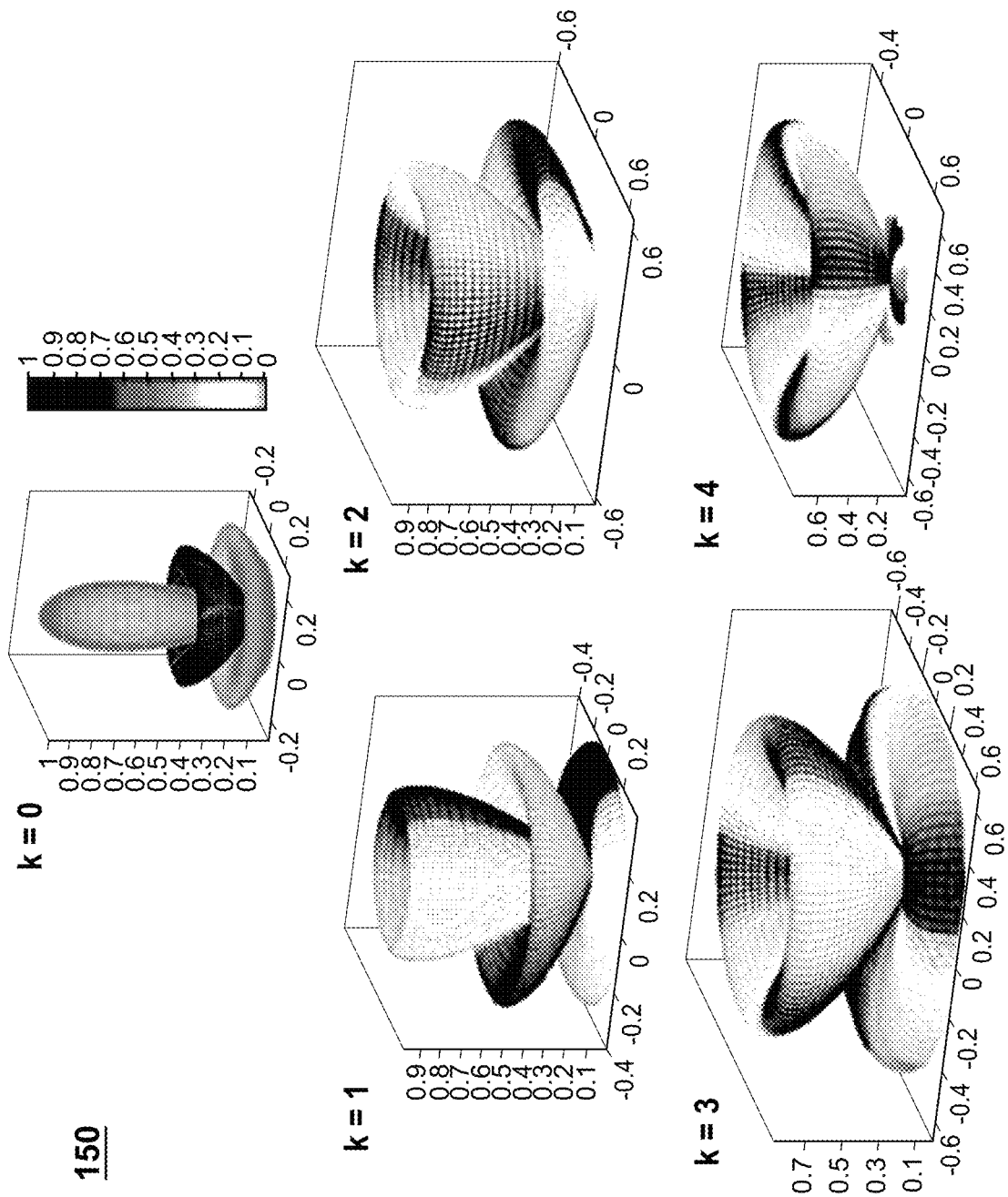
FIG. 2 depicts a three dimensional graph of representative far-field OAM RF beam patterns for different modes.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

As used herein, the term "about" or "approximately" refers to a +/−10% variation from the nominal value. It is to be understood that such a variation is always included in a given value provided herein, whether or not it is specifically referred to.

Unless otherwise defined, all technical and scientific terms used herein have the same meaning as commonly understood by one of ordinary skill in the art to which the described embodiments appertain.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present technology. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules or units which are implied to be software, may be represented herein as any combination of flowchart elements or other elements indicating performance of process steps and/or textual description. Such modules may be executed by hardware that is expressly or implicitly shown. Moreover, it should be understood that module or unit may include for example, but without being limitative, computer program logic, computer program instructions, software, stack, firmware, hardware circuitry or a combination thereof which provides the required capabilities.

It should be understood that orbital angular momentum (OAM) radio-frequency (RF) waves manifest various orders of OAM modes, denoted by integers ±k. The OAM RF waves are generated by imposing a phase shift of k2π radians for every revolution of the observation point around the beam axis to produce a helical waveform front, which may be described as "corkscrew shaped". This may be achieved, in some implementations, by using a uniform circular array of K identical antenna elements, in which each of the K elements is fed by a current that is shifted in phase from that of its neighbouring element in one direction by k2π/K radians at the same amplitude.

With these fundamentals in place, we will now consider some non-limiting examples to illustrate various implementations of aspects of the present disclosure.

FIG. 1 (Prior Art) illustrates a high-level functional block diagram of a conventional OAM RF receiving system 100. As depicted, OAM system 100 comprises a circular array 110 of K antenna elements $a_1$-$a_K$ and a Butler Matrix structure 120 having K input ports $C_1$-$C_K$ and K output ports $P_1$-$P_K$ (for illustrative purposes, K=4 in FIG. 1). The OAM system 100 operates in the receive mode to sense multiple OAM beam excitations along the circular array of K antenna elements. This is achieved by coupling the K antenna elements $a_1$-$a_K$ to the K input ports $C_1$-$C_K$ of the Butler Matrix structure and coupling the K output ports $P_1$-$P_K$ to the K receivers in the same RF band. Each of the K OAM beams is modulated by a different stream of independent information-bearing data symbols, which are fed to a separate receiver. Being reciprocal, the same structure works in the transmitting mode, with the receivers replaced by transmitters, each of which is modulated by a different stream of independent data symbols.

FIG. 2 (Prior Art) depicts a three-dimensional graph of representative far-field OAM RF beam patterns 150 for different modes. As shown, the OAM beam patterns 150 exhibit a conical shape for all non-zero k orders having "vortex-shaped" axial nulls. The shade gradations indicate the electrical phase at a fixed time, modulo-2π radians, in which the phase patterns rotate around the beam axis at the RF rate in time (i.e. one revolution per cycle at RF). In so doing the k phase fronts, as shown by the repeating shade gradations, pass a point on the cone of the k-th OAM beam along the tangential direction, per period of the RF carrier wave. Equivalently, at any given point in time, an electrical phase gradient of k2π/(2πR) radians per meter exists along the circular locus of radius R around the axis of the conical beam of the k-th order OAM mode.

As noted above, the non-zero k order OAM beam patterns 150 manifest "vortex-shaped" axial nulls at far-field distances, which is typically where conventional receiving antennas/apparatuses are positioned. Furthermore, the conventional receiver processing of OAM beams generally rely on spatial techniques employing the reciprocal principles used to generate the OAM modes at the transmitter.

Due to these factors, conventional attempts at exploiting the OAM modes to enhance the capacity of radio links suffer from low signal-to-noise ratios (SNRs) and sensitivity to crosstalk issues associated with positioning errors. Moreover, such attempts impose implementation restrictions on receiving antennas/apparatus, such as, requiring the use of large receiving antennas and operational constraints regarding the use of very short wavelengths and limited range distances, or a combination of these.

Co-owned U.S. patent application Ser. No. 16/294,513 (hereinafter "the '513 Application"), filed on Mar. 6, 2019 (having a priority date of Oct. 19, 2018), entitled "OAM PSEUDO-DOPPLER RECEIVING ARCHITECTURE," the contents of which are hereby incorporated by reference in its entireties, discloses schemes and techniques that apply a pseudo-Doppler modulation at frequency F to artificially emulate the physical rotating motion of receiving antenna elements. This emulation creates a pseudo-Doppler effect based on the phase gradient of a radiated OAM beam at its peak, at distance R from its axis. The pseudo-Doppler modulation and phase-shift in the receiving antenna receiver paths imparts a fractional Doppler frequency shift that is proportional to the order k of each of the radiated OAM modes of the signals that are received by stationary receiver antennas during time-gating intervals. The schemes and techniques disclosed by the '513 Application operate to exploit the fractional Doppler frequency shift to facilitate mode separation/recovery processing and subsequent extraction of payload data for stationary receiver antennas.

Figure 3:
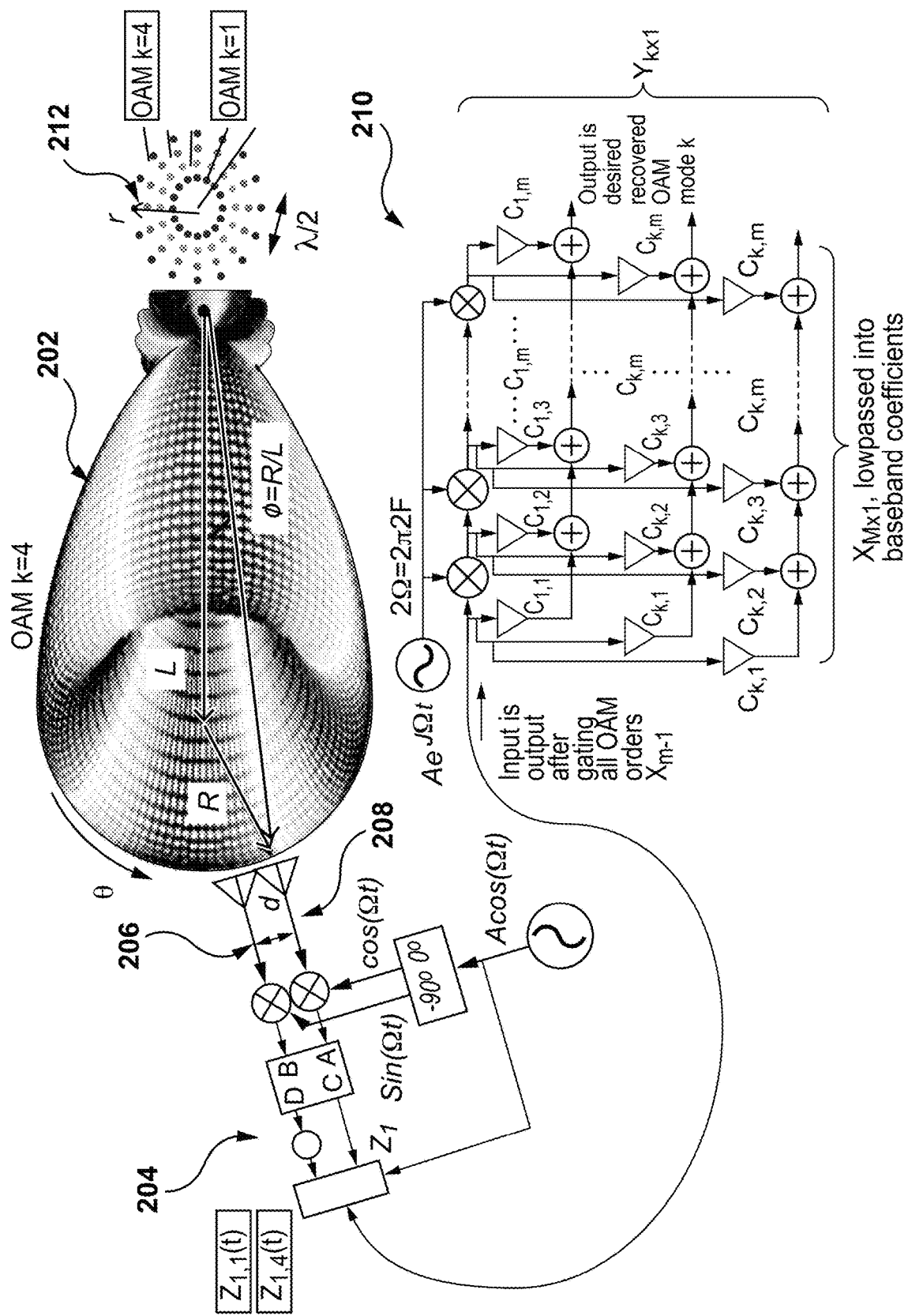
FIG. 3 illustrates a conceptual view of pseudo-Doppler techniques and corresponding operational parameters for an OAM stationary receiver.

FIG. 3 illustrates a conceptual view 200 of the '513 Application pseudo-Doppler techniques and corresponding operational parameters for an OAM stationary receiver. As shown, an OAM conical beam 202 of order k (for illustrative purposes, K=4 in FIG. 3) is being radiated by a base station (BS) 212. The OAM conical beam 202 have a beam cone radius R, is received by a stationary receiver 204 positioned at a distance L and at an angular orientation θ relative to the central axis of the radiated OAM conical beam 202. Antenna elements 206 and 208 associated with the stationary receiver 204 are separated by a distance d tangential to the peak region of the OAM conical beam at distance R from the central axis of the radiated OAM conical beam 202.

For the stationary receiver case, these operational parameters such as the beam cone radius R, antenna elements separation distance d, angular orientation θ etc. may be known à-priori or estimated/derived (e.g., via channel state information data). As such, a pseudo-Doppler modulation frequency F may be determined to satisfy the relationship:

$$2\pi F d/(2R) \geq 2\pi B \quad (1)$$

where B is the bandwidth associated with the OAM conical beam 202. Thus, at the determined pseudo-Doppler modulation frequency F, the fractional Doppler frequency shift may be accurately estimated as:

$$kFd/(2R) \quad (2)$$

where k is the order of the radiated OAM conical beam 202. The stationary receiver 204 of the '513 Application pseudo-Doppler techniques was designed on the assumption that the stationary receiver 204 is fixed with respect to the radiated OAM conical beam 202 and the pseudo-Doppler modulation frequency F was also not varied or adjusted. However, for a mobile receiver (i.e., mobile station (MS) or user equipment (UE) which may be used interchangeably) case, certain operational parameters may vary as the MS travels and/or changes its orientation relative to the OAM conical beam 202. For example, R and L may vary due to MS movement and the effective d which may be equal to d cos(θ) and θ may vary due to changes in MS orientation. It will be appreciated that in order for OAM mode recovery to be effective, the fractional pseudo-Doppler shift should be maintained at values greater than the composite signal bandwidth B. Thus, for moving MS receivers, these operational parameter variations need to be detected, compensated for, and adjusted by the receiver to enable accurate OAM mode processing and recovery. In addition, the BS 212 may also transmit OAM modes that are steered to follow a desired MS, thus adding to the variability of the fractional pseudo-Doppler frequency shifts produced at the MS.

Figure 4:
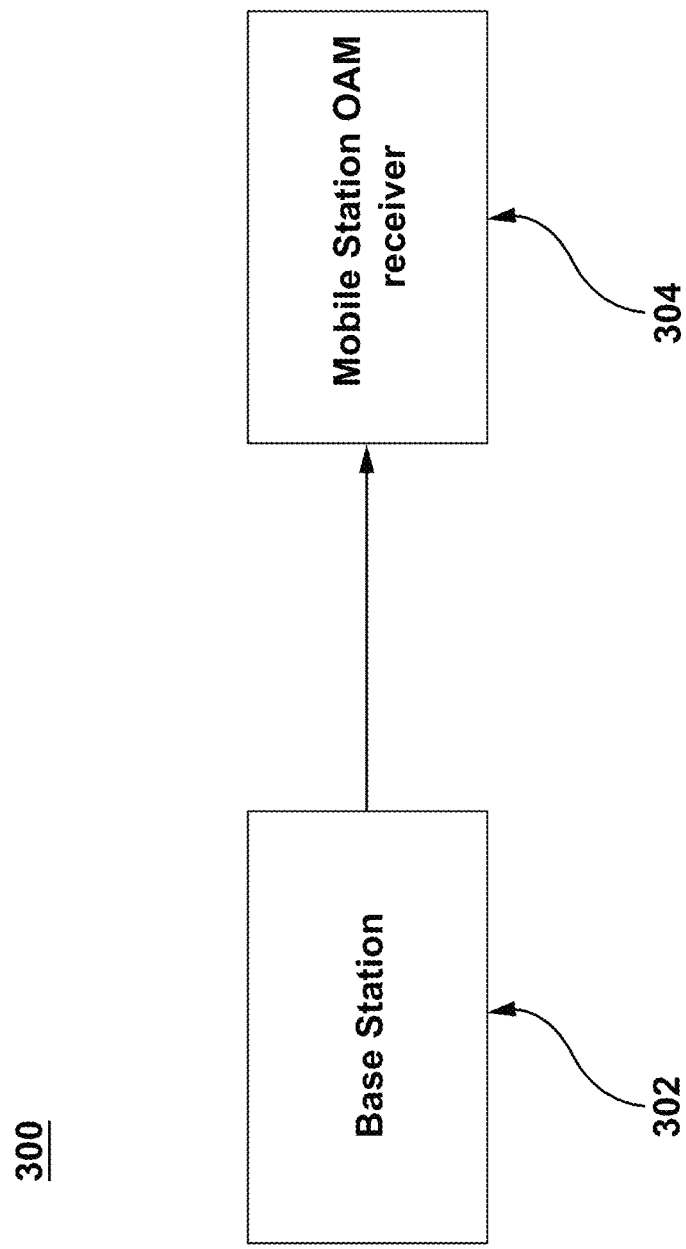
FIG. 4 illustrates a high-level functional block diagram of an OAM based transceiver system, in accordance with various embodiments of the present disclosure.

With this said, FIG. 4 illustrates an OAM based transceiver system 300 configured to transmit various information using OAM modes at transmitter end and receive at receiver side and segregate the OAM modes to extract the transmitted information, in accordance with various embodiments. As shown, the OAM based transceiver system 300 comprises a base station (BS) 302 and a mobile station (MS) OAM receiver 304. It is to be noted that other elements may be present but not illustrated for the purposes of tractability and simplicity.

The BS 302 may be configured to generate and transmit k OAM modes such that their beam footprints substantially overlap in space. In certain embodiments, the BS 302 may be configured to steer the k OAM modes to follow a desired MS such as OAM receiver 304, thus adding to the variability of the fractional pseudo-Doppler frequency shifts produced at the MS OAM receiver 304. Details associated with the BS 302 will be discussed later in the disclosure.

The OAM receiver 304 may be configured to receive the k OAM modes simultaneously and process the k OAM modes to segregate the k OAM modes to extract the transmitted information from each of them. As will be described in detail below, the disclosed embodiments provide an implementation and process for switching among two antennas that are not collinear with a third antenna and a structure that compensates for any phase shifts or delays among the switched antennas as the MS OAM receiver 304 moves within the common footprints of the OAM beams. As noted above, it should be understood that reference to MS OAM receiver 304 should be understood to be any OAM receiver, and may be implemented in an electronic device such as a UE. In addition, the implementation is configured to also adjust the pseudo-Doppler modulation frequency, and adaptively adjust the OAM frequency-domain filter coefficients. Such a configuration provides the capability of sensing the receiving MS position L and orientation θ relative to the BS 302 as well as determining the pseudo-Doppler frequency F and effective distance d of the antenna elements in order to satisfy the condition of equation (1).

Figure 5:
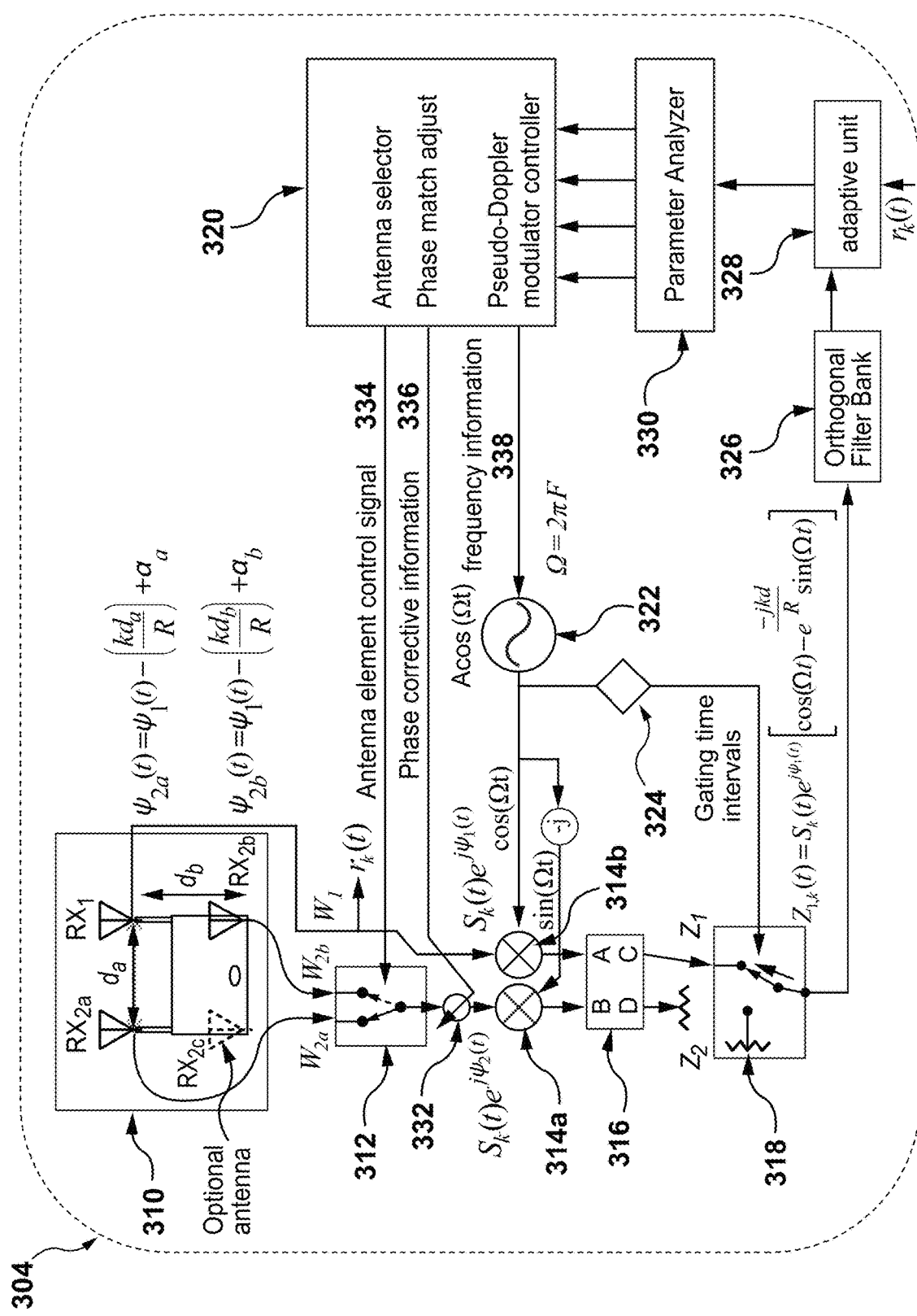
FIG. 5 illustrates a high-level functional block diagram of a mobile station (MS) OAM receiver, in accordance with various embodiments of the present disclosure.

In particular, FIG. 5 illustrates a high-level functional block diagram of the MS OAM receiver 304, in accordance with various embodiments of the present disclosure. As shown, MS OAM receiver 304 employs an antenna unit 310, an antenna-selection switch 312, modulators 314a, 314b, a hybrid coupler 316, a switching unit 318, and a controller 320, a variable frequency oscillator 322, a time-gating unit 324, an orthogonal filter bank 326, a adaptive unit 328, a parameter analyzer 330 and a phase adjusting unit 332. It is to be noted that the MS OAM receiver 304 may include other elements such as digital signal processors, and other associated components/modules configured to execute the pseudo-Doppler techniques. However, such elements have not illustrated for the purposes of tractability and simplicity.

As shown, antenna unit 310 incorporates at least three antenna elements $RX_1$, $RX_{2a}$, $RX_{2b}$, in which antenna element $RX_1$ is configured as a reference antenna element that is used in common with either $RX_{2a}$ or $RX_{2b}$ during paired signal receptions, the selection of the latter being effected by the antenna-selection switch 312. That is, during paired receptions, antenna elements $RX_1$, $RX_{2a}$ are separated by a distance $d_a$ and antenna elements $RX_1$, $RX_{2b}$ are separated by a distance $d_b$. Antenna elements $RX_1$, $RX_{2a}$, $RX_{2b}$, are configured to receive a composite OAM-RF wave comprising of k OAM modes radiated by the BS 302. In certain embodiments, antenna unit 310 may further incorporate a fourth antenna element $RX_{2c}$, connected to the antenna-selection switch 312 for selecting it in case that one of the other antenna elements becomes obstructed. It will be appreciated that fourth antenna element $RX_{2c}$ may be similarly selected as any of the receiver elements to account for such contingencies.

The phases of composite given k-th order OAM-RF wave that are received by antenna elements $RX_1$, $RX_{2a}$, $RX_{2b}$ are referenced as $\psi_1$, $\psi_{2a}$, $\psi_{2b}$, respectively. These phases may differ by $$\left(\frac{kd_n}{R}\right)$$

along with practically computed phase constant $\alpha_n$ for a portion of the footprint covered by their respective antenna element separation distances $d_n$. Therefore, the relative relationships between phases $\psi_1$, $\psi_{2a}$, $\psi_{2b}$ of receiver antenna elements $RX_1$, $RX_{2a}$, $RX_{2b}$ at time t for a given OAM mode k may be expressed as follows:

$$\psi_{2a}(t) = \psi_1(t) - \left(\frac{kd_a\cos(\theta)}{R}\right) + \alpha_a \quad (3)$$

$$\psi_{2b}(t) = \psi_1(t) - \left(\frac{kd_b\sin(\theta)}{R}\right) + \alpha_b \quad (4)$$

where $d_a$, $d_a$: separation distances between $RX_1$, $RX_{2a}$ and $RX_1$, $RX_{2b}$, respectively;
- k: k-th OAM mode associated with the composite OAM-RF wave;
- R: radius of the k-th OAM mode associated with the composite OAM-RF wave;
- $\alpha_a$, $\alpha_b$: constant phases between the receivers imposed in accordance with a control signal determined by the parameter analyzer 330 associated with the MS OAM receiver 304,
- θ: orientation angle of the antenna unit 310 baseline $d_a$ relative to the direction tangential to the OAM beam footprint at the MS OAM receiver 304.

Given these phase relationships, the output signals of the antenna unit 310, referenced as $W_1$, $W_{2a}$, $W_{2b}$, may be expressed as follows:

$$W_{1,k}(t) = S_k(t)e^{j\psi_1(t)} \quad (5)$$

$$W_{2a,k}(t) = S_k(t)e^{j\psi_{2a}(t)} = S_k(t)e^{j\psi_1(t) - \frac{jkd_a}{R}} \quad (6)$$

$$W_{2b,k}(t) = S_k(t)e^{j\psi_{2b}(t)} = S_k(t)e^{j\psi_1(t) - \frac{jkd_b}{R}} \quad (7)$$

where, $S_k(t)$ is the signal associated with the k-th OAM mode associated with the composite OAM-RF wave.

As noted above, the OAM receiver 304 employs the antenna-selection switch 312 and in order to prevent "break-before-make" switching discontinuities in the selected antenna signal (i.e. to effect smooth switching between the receiver antenna elements $RX_{2a}$, $RX_{2b}$), in certain embodiments, the antenna-selection switch 312 may be based on variable ratio power combiner. The antenna-selection switch 312 operates to switch between the signals output by two antenna elements that are not collinear to maximize the diversity between the antenna elements. For example, the depicted embodiment provides that signal $W_{2a}$, output from the receiver antenna element $RX_{2a}$, and signal $W_{2b}$, output from the receiver antenna element $RX_{2b}$, are supplied to the antenna-selection switch 312. The switching between output signals $W_{2a}$, $W_{2b}$ is driven by an antenna element control signal 334 as supplied by the controller 320. In certain embodiments, the antenna-selection switch 312 may select receiver antenna element $RX_{2a}$ if orientation angle θ is such that the absolute value of its cosine is greater than that of the absolute value of its sine, and select receiver antenna $RX_{2b}$ otherwise. Initially, θ=0 may be assumed so that effectively separation distance $d=d_a$ and $d_b=0$, resulting in the receiver antenna element $RX_{2a}$ being selected. Details about the antenna element control signal 334 will be discussed later in this disclosure.

In certain embodiments, the output signal $W_1$ from antenna element $RX_1$ may also include a reference signal $r_k(t)$ encompassing training signal information for k-th OAM mode transmitted by the BS 302 to the MS OAM receiver 304. That is, in accordance with the certain embodiments, the BS 302 operates to transmit at least one separate training signal for each k-th OAM mode to provide OAM-related reference information to the MS OAM receiver 304 for subsequent processing.

The output of the antenna-selection 312, which provides switched portions of output signals $W_{2a}$, $W_{2b}$ data, is then supplied to the phase adjusting unit 332. The phase adjusting unit 332 operates to adjust the phase of the output of the antenna-selection 312. In particular, if the selected signal is $W_{2a}$ then the phase adjusting unit 332 adjusts the phase of $W_{2a}$ by an amount of $\alpha_a$. Similarly, if the selected signal is $W_{2b}$ then the phase adjusting unit 332 adjusts the phase of $W_{2b}$ by an amount of $\alpha_b$. The phase adjusting unit 332 is supplied with the phase corrective information signal 336 by the controller 320. Such information may be based on detected parameter information, such as, OAM filter coefficients during preamble training, physical orientation and position of the MS OAM receiver 304, signal quality or received signal levels (RSLs), channel state information (CSI), or any combination of these. The output of the phase adjusting unit 332 may be represented as phase adjusted switched output signal $S_k(t)e^{j\psi_2(t)}$.

The phase adjusted switched output signal $S_k(t)e^{j\psi_2(t)}$ and the signal $S_k(t)e^{j\psi_1(t)}$ from the antenna element $RX_1$ are supplied to the modulators 314a, 314b, respectively. The modulators 314a, 314b operate to multiply the signals with waveforms possessing opposing monotonic amplitude in a manner that at least in some interval (e.g. gating interval) during their period, one of them is approximately linearly increasing in amplitude while the other is simultaneously decreasing in amplitude with time. Both the sinusoidal waveforms being operated at the pseudo-Doppler (radian) frequency Ω, where Ω=2πF. By way of example waveforms may be a real value cosine signal and a real valued sine signal. However, in certain embodiments, non-sinusoidal modulation waveforms may also be used with a characteristic that one of them is approximately linearly increasing in amplitude while the other is simultaneously decreasing in amplitude with time. It is noted that the pseudo-Doppler waveform, the sample rate, and the clock of the signal-processor (e.g., FPGA, DSP, etc.) are all configured to be phase-coherent and derived from the same frequency source.

Moreover, the pseudo-Doppler (radian) frequency Ω that is supplied to the modulators 314a, 314b, is provided by the variable frequency oscillator 322 that receives frequency information signal 338 from the controller 320. Such information may be based on detected parameter information, such as, OAM filter coefficients during preamble training, physical orientation and position of the MS OAM receiver 304, signal quality or received signal levels (RSLs), channel state information (CSI), or any combination of these.

The two modulated signals are then forwarded to the hybrid coupler 316 that operates to provide a proportional summation of the two modulated signals, namely, as coupler output signal $Z_1$, and a proportional difference of the two modulated signals, as coupler output signal $Z_2$. As such, the hybrid coupler 316 outputs signals $Z_1$ and $Z_2$ that respectively contain fractional pseudo-Doppler frequency shift information that is proportional to OAM +k and OAM −k orders.

In the depicted embodiment, the hybrid coupler 316 output signal $Z_1$ is supplied to switching unit 318. However, it will be appreciated that the hybrid coupler 316 output $Z_2$ or a combination of coupler outputs $Z_1$ and $Z_2$ may be supplied to switching unit 318. The operation of switching unit 318 is controlled by the time-gating unit 324 that is configured to provide a synchronous time-gating function to limit the coupler output signal $Z_1$ (or $Z_2$ or a combination of the two) to the time-intervals of validity when the desired fractional pseudo-Doppler frequency shifts occur. Thus, for each OAM order k, the MS OAM receiver 304 produces a time-gated output that may be expressed as:

$$Z_{1,k}(t) = S_k(t)e^{j\psi_1(t)}\left[\cos\Omega t - e^{-\frac{jkd}{R}}\sin\Omega t\right] \quad (8)$$

After some algebraic manipulation and practical assumptions, equation (8) may be represented as:

$$Z_{1,k}(t) \approx \sqrt{2}\,S_k(t)e^{j\left(\psi_1(t)-\frac{kd}{2R}\right)}\cos\left(\Omega t + \frac{\pi}{4}\right)e^{j\left(\frac{kd}{2R}\right)\left(\Omega t+\frac{\pi}{4}\right)} \quad (9)$$

which identifies in equation (8) the pseudo-Doppler phase shift information of $$j\left(\frac{kd}{R}\right)$$

for each OAM mode order k. Equation (9) further identifies a corresponding pseudo-Doppler radian frequency shift of $$\left(\frac{k\Omega d}{2R}\right)$$

that is proportional to the pseudo-Doppler phase shift information. Such pseudo-Doppler phase and frequency shift information may be used to adjust the pseudo-Doppler modulation frequency and phase and adapt the filter coefficients of the adaptive unit 328. It is to be noted that equation (9) represents the time-gated output for k-th OAM mode merely for the purpose of simplicity. However, the output of the switching unit 318 may include time-gated output for all of the K OAM modes and may be represented as $Z_1(t)=\Sigma_k Z_{1,k}(t)$.

Figure 6:
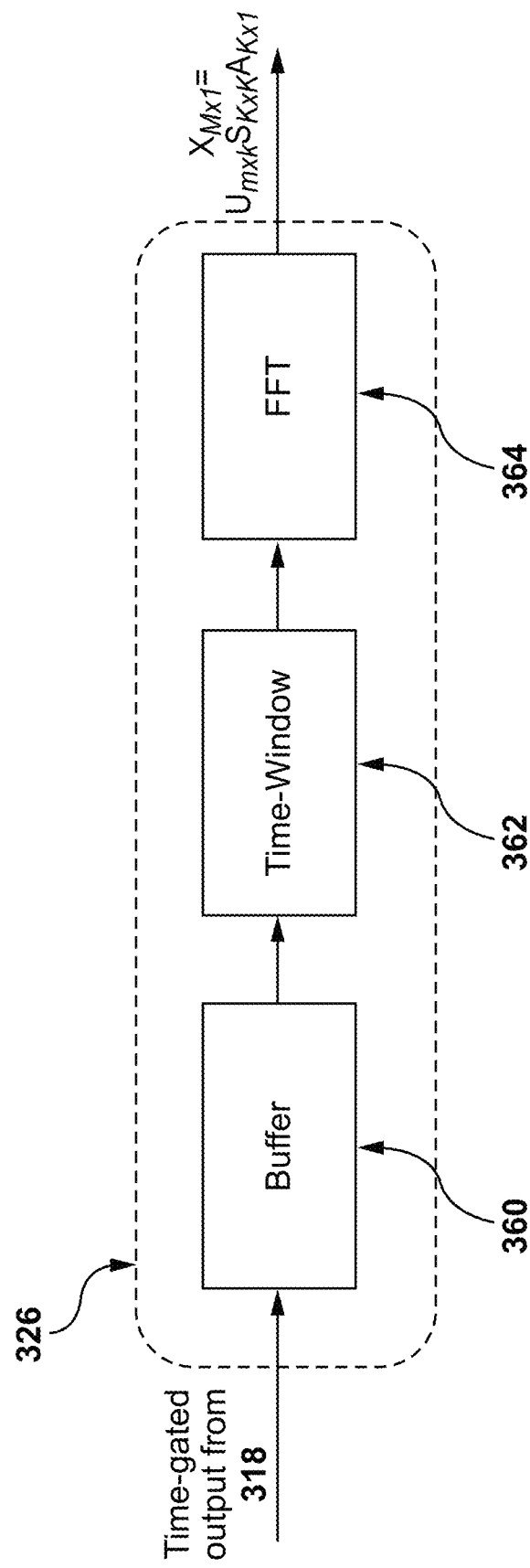
FIG. 6 illustrates a high-level functional block diagram of an orthogonal filter bank, in accordance with various embodiments of the present disclosure.

In certain embodiments, the time-gated output $Z_{1,k}(t)$ represented by equation (9) may be supplied to the orthogonal filter bank 326 for further processing. To this end, FIG. 6 illustrates a high-level functional block diagram of the orthogonal filter bank 326, in accordance with various embodiments of the present disclosure. As shown, the orthogonal filter bank 326 employs a buffer 360, a time-window unit 362 and a Fast-Fourier Transform (FFT) unit 364. It is to be noted that other elements may be present but not illustrated for the purposes of tractability and simplicity.

In certain embodiments, the orthogonal filter bank 326 may be implemented using a FFT matrix to multiply a vector of time-samples provided at the output of the buffer 360, thereby selecting each spectral component. The orthogonal filter bank 326 may also serve as an anti-alias filter. The size of the orthogonal filter bank 326 $N_{FFT}$ representing samples of the time-gated output $Z_{1,k}(t)$ may be expressed as:

$$N_{FFT} = \frac{PF_S}{2F_{Doppler}} \quad (10)$$

where P is an integer, $F_S$ is the sampling frequency and $F_{Doppler}=F$ is the pseudo-Doppler modulation frequency.

In particular, the time-gated output $Z_{1,k}(t)$ passes though the buffer 360, which accommodates (stores) $N_{FFT}$ samples of the time-gated output $Z_{1,k}(t)$. In this manner, the time-gated output $Z_{1,k}(t)$ may be effectively transformed into a vector of the same length. When generating such vector representation of the time-gated output $Z_{1,k}(t)$, the buffer 360 may discard the earliest sample and appends the latest one, while shifting the other samples by one sample. Further, the time-window unit 362 may be configured to apply a suitable time window technique, for example, rectangular or triangular techniques to the vector as provided by the buffer 360 to generate a time window output.

In some embodiment, the time window is such that its FFT has zeros at intervals of $2F_{Doppler}$. The time window may be, for example, rectangular or triangular, as long as it results in orthogonal frequency responses after multiplication by the FFT matrix. The time window output is then provided to the FFT unit 364. The FFT unit 364 applies FFT to the time window output.

Figure 7:
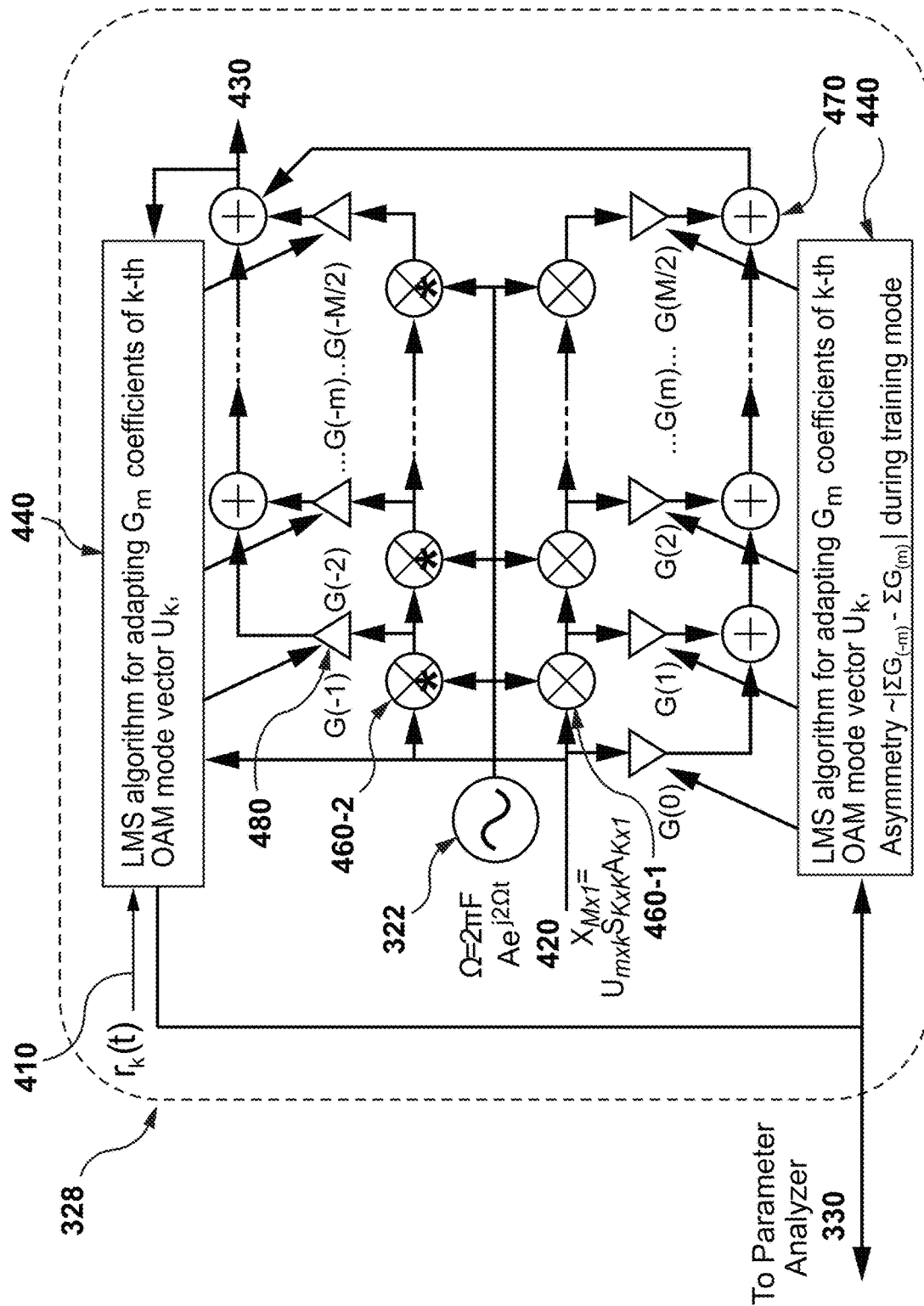
FIG. 7 illustrates a high-level functional block diagram of one unit of a adaptive unit, in accordance with various embodiments of the present disclosure.

After the FFT has been applied at the FFT unit 364, M (where M is at least K) non-zero spectral components from the orthogonal filter bank 326 at integer multiples of F are then arranged into a vector $X_{M\times 1}(t)$. The vector $X_{M\times 1}(t)$ describing the composite OAM-RF wave comprising of K OAM modes is then transmitted to the adaptive unit 328. The Vector $X_{M\times 1}(t)$ may be expressed as:

$$X_{M\times 1}(t) = \sum_{k=\frac{-K}{2}}^{\frac{K}{2}-1} U_{k,M\times 1}S_k(t)\beta_k \quad (11)$$

where, $U_{k,M\times 1}$ is the spectral envelope coefficient for the k-th OAM mode and $\beta_k$ is the arrival proportion of the k-th OAM mode In certain embodiments, the adaptive unit 328 may be configured to segregate the composite OAM-RF wave comprising of k OAM modes into plurality of OAM-RF waves each comprising single OAM mode. Also, the adaptive unit 328 may be configured to provide asymmetry parameter associated with each k-th OAM mode to the controller 320. To this end, FIG. 7 illustrates a high-level functional block diagram of one unit of the adaptive unit 328, in accordance with various embodiments of the present disclosure. It will be appreciated that the adaptive unit 328 may have at least K such units. In certain embodiments, the adaptive unit 328 may be based on a Least Mean Squares (LMS) configuration to determine the optimal filter coefficient values for each k-th OAM mode. However, it is to be noted that in certain embodiments any other suitable adaptive algorithm may be used. Such adaptive algorithms may include Recursive Least Squares (RLS), Newton-LMS, or various forms of Neural Networks (NN) for separation of statistically independent signals such as Jutten-Herault network or the like.

As shown, the adaptive unit 328 may be configured for adaptively adjusting the filter coefficients $G_m$ of the $k^{th}$ OAM mode of received vector $X_{M\times 1}(t)$ in which:
  k: represents the OAM order;
  m: represents the index number of a frequency shift;
  K: represents the total number of OAM ±k orders
  M: represents the total number of m frequency shifts [−M/2 to M/2], where M≥K;

$G_m$: represents the vector of OAM filter coefficients for frequency shift m;

It is to be understood that, for purposes of tractability and simplification, FIG. 7 depicts the adaptive unit 328 that adjusts and resolves filter coefficients $G_m$ for a single OAM mode k. It should also be understood that, in accordance with the disclosed embodiments, the adaptive unit 328 is to be applied to each of the remaining OAM K−1 modes. In other words, the adaptive unit 328 is to be replicated K−1 times in parallel fashion to resolve the filter coefficients $G_m$ for all K OAM modes.

As illustrated by FIG. 7, the adaptive unit 328 incorporates a LMS algorithm block 440, multiple multiplication elements 460-1 and conjugate multiplication elements 460-2 driven by the variable frequency oscillator 322, multiple summing elements 470, and multiple coefficient generating elements 480. In this configuration, the adaptive unit 328 receives the reference signal $r_k(t)$ as well the vector $X_{M\times 1}(t)$ from the orthogonal filter bank 326 that contains OAM pseudo-Doppler phase/frequency shift information. The adaptive unit 328 operates to process the vector $X_{M\times 1}(t)$ in view of reference signal $r_k(t)$ to produce an output signal $y_k(t)$ that is compared to reference signal $r_k(t)$ to generate an error signal $e_k(t)$. The error signal $e_k(t)$ is then correlated with each element of vector $X_{M\times 1}(t)$ and used as a control signal to drive the adaptive process to resolve the filter coefficients $G_m$ for kth mode (i.e., $G_{k,m}$).

Specifically, as shown in FIG. 7, at input 410 reference signal $r_k(t)$ is supplied to the LMS algorithm block 440. As noted above, for each OAM mode k, the BS 302 transmits at least one reference signal $r_k(t)$ containing training information with baseline parameter values that include reference filter coefficient values. As also noted above and indicated in FIG. 5, reference signal $r_k(t)$ is not subjected to any switching, modulation, or gating operations by MS OAM receiver 304.

In certain embodiments, the vector $X_{M\times 1}(t)$ may be supplied to the adaptive unit 328 at input 420. The adaptive unit 328 may process the vector $X_{M\times 1}(t)$ by applying multiplication operations via successive multiplication elements 460-1 and 460-2 that are driven at the pseudo-Doppler modulation frequency F as provided by the variable frequency oscillator 322. In so doing, the multiple multiplication elements 460-1 and conjugate multiplication elements 460-2 convert the frequency components associated with the vector $X_{M\times 1}(t)$ associated to low frequency components. As such, the multiplication operations will generate both, non-negative (m=0 to M/2) and negative (m=−1 to −M/2) low frequency-shifted replicas of the vector $X_{M\times 1}(t)$.

In turn, the outputs of multiplication elements 460-2 that contain the negative low frequency-shifted replicas of the vector $X_{M\times 1}(t)$ are forwarded to coefficient generating elements 480 G(−1)–G(−M/2) (depicted in the upper portion of the adaptive unit 328). Similarly, the multiplication elements 460-1 outputs containing the non-negative low frequency-shifted replicas of the vector $X_{M\times 1}(t)$ are forwarded to coefficient generating elements 480 G(0)–G(M/2) (depicted in lower portion of the adaptive unit 328).

As noted above, the LMS algorithm block 440 operates to process the vector $X_{M\times 1}(t)$ in view of reference signal $r_k(t)$ to produce an output signal $y_k(t)$ that is compared to reference signal $r_k(t)$ to generate an error control signal $e_k(t)$. The error control signal $e_k(t)$ is then used to generate the filter coefficients $G_m$ for OAM mode k.

The LMS-based operations of the LMS algorithm block that recovers the k-th OAM mode 440 may be mathematically represented as:

$$e_k(t) = G_k^H(t) X_k(t) - r_k(t) \tag{12a}$$

$$= y_k(t) - r_k(t) \tag{12b}$$

$$e_k(t) = G_k^H(t) X_k(t) - r_k(t) \tag{12a}$$

$$= y_k(t) - r_k(t) \tag{12b}$$

$$e_k^*(t) X_k(t) = \tau \frac{d}{dt} G_k(t) \tag{13}$$

where:
$e_k(t)$: represents the error signal generated by comparing output signal $y_k(t)$ to reference signal $r_k(t)$;
$e^*_k(t)$: represents the conjugate of $e_k(t)$;
$G_k(t)$: represents a coefficient vector containing the complex adaptive filter coefficient values;
$G^H_k(t)$: represents a conjugate transpose of vector $G_k(t)$; and
$X_k(t)$: represents a vector containing the shifted low-frequency (baseband) values of the spectral replicas output by the FFT unit 364 of all the OAM modes, but only the k-th mode is effective in the k-th block of the algorithm.

Thus, for each OAM order k, equations (12a), (12b) indicate that the LMS algorithm block 440 generates an error signal $e_k(t)$ based on the difference between output signal $y_k(t)$ and reference signal $r_k(t)$. Moreover, equation (13) indicates that the coefficient values of matrix $G_k(t)$ may be obtained by integrating the product of $e^*_k(t)$ and $X_k(t)$ values, (i.e. correlating them). In so doing, i.e. by applying these coefficients to the multiplication units 460-1 and 460-2, the adaptive unit 328 may provide recovered k-th OAM mode at the output 430. Moreover, the LMS algorithm block 440 may provide coefficient envelope asymmetry value approximately equal to $|\Sigma G_{(-m)} - \Sigma G_{(m)}|$ during training mode. As such, the asymmetry value may be provided to the parameter analyzer 330 for further processing. It will be appreciated that the above discussion is with respect to k-th OAM mode, as the signals in the other modes in the composite vector X(t) will not correlate with the signal in mode k, so only vector $X_k(t)$ was used for clarity. However, FIG. 8 summarizes the mathematical bases that support the resolution of matrix C coefficient values for all K OAM modes and all ±M/2 frequency shifts similar to the matrix $G_k(t)$ for the k-th OAM mode.

In certain embodiments, the OAM receiver 304 may comprises various sensors to detect and provide mobility information to the parameter analyzer 330. Such mobility parameters may include motion, rotation, position, orientation, etc. Also, the OAM receiver 304 may be configured to receive BS-transmitted mode k training signal information for initializing filter coefficients, receive BS-transmitted channel state information (CSI), detected phase/frequency fluctuations, detect OAM filter coefficient asymmetries, detect OAM mode non-orthogonality, detect received signal levels (RSLs), etc. All such received/detected signal and mobility parameters may be provided to the parameter analyzer 330.

Figure 9:
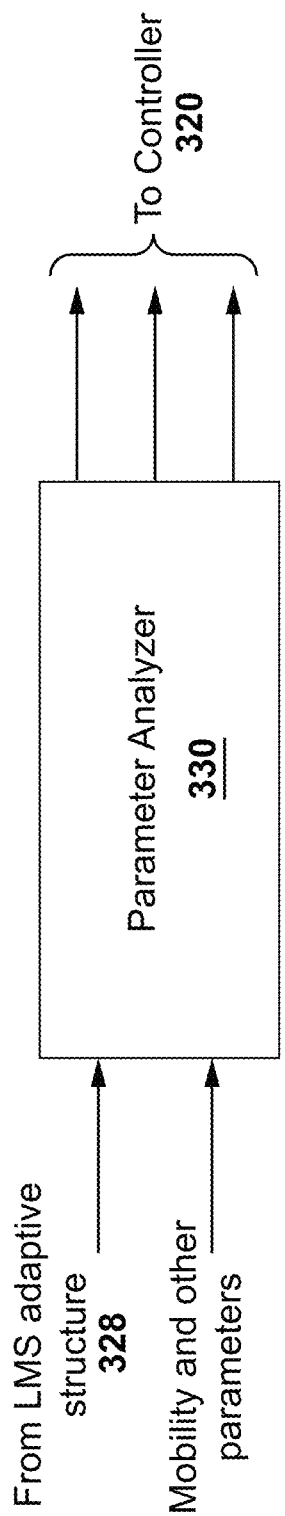
FIG. 9 illustrates a high-level functional block diagram of a parameter analyzer, in accordance with various embodiments of the present disclosure.

With this said, FIG. 9 illustrates a high-level functional block diagram of a parameter analyzer 330, in accordance with various embodiments of the present disclosure. As shown, the parameter analyzer 330 may be configured to analyze received/detected signal and mobility parameters and may provide various controlling signals to the controller 320. Thus, the disclosed MS OAM receiver 304 and the adaptive unit 328 in conjunction with the parameter analyzer 330 operate to enable the MS OAM receiver 304 to effectively recover and process the data-bearing streams of received OAM modes, even during the MS OAM receiver 304 travels and orientation movement. As noted above, the MS OAM receiver 304 may be configured to switch among various receiver antenna output signals (e.g., $W_{2a}$, $W_{2b}$, or $W_3$) based on received/detected signal and mobility parameters information to compensate for the MS OAM receiver 304 travels and orientation movement. In addition, the implementation is configured to also adjust the pseudo-Doppler modulation frequency F, and adaptively resolve the OAM filter coefficients C.

Returning to FIG. 5, in certain embodiments, during training of the MS OAM receiver 304, a known training sequence $r_k(t)$ may be initially transmitted for the highest OAM order k=K, with no signals transmitted for the other K−1 modes. It should be appreciated that, the higher the OAM mode, the higher degree of envelope asymmetry is produced. As such, the adaptive unit 328 operates to estimate filter coefficient envelope asymmetry values for the highest OAM order, in the manner noted above, to generate optimal OAM filter coefficients $G_{K,m}$. If the estimated coefficient envelope asymmetry values are less than a predefined threshold and the pseudo-Doppler modulation frequency F is near its maximum, based on inputs from the parameter analyzer 330, the controller 320 operates to switch from antenna output signal $W_{2a}$ to $W_{2b}$ or vice-versa (depending on the initial state). In so doing, the controller 320 provides the antenna element control signal 334 to the antenna-selection switch 312. Otherwise, the controller 320 adjusts the pseudo-Doppler modulation frequency F of the variable frequency oscillator 322 to a predetermined value.

Next, a known training sequence $r_k(t)$ may be transmitted at the OAM order k=0, with no signals transmitted for the remaining K−1 modes. It should be appreciated that OAM mode k=0 produces the least amount of envelope asymmetry, indicating that asymmetric values are primarily due to phase alignment issues. Accordingly, the adaptive unit 328 estimates filter-coefficient asymmetry values and generates optimal OAM filter coefficients $G_{0,m}$. Based on the envelope asymmetry values and input from the inputs from the parameter analyzer 330 the controller 320 corrects the phase of the output of the antenna-selection switch 312 by adjusting the phase of the phase adjusting unit 332 in accordance with practically computed phase constant $\alpha_n$(e.g. $\alpha_a$, $\alpha_b$), until the filter coefficient envelope asymmetry values is substantially eliminated (i.e., approximately 0).

Finally, during normal operation signals containing information-bearing payload data are transmitted on all OAM ±K/2 modes and the frequency-domain filters are switched to decision-directed modes, obtaining their reference signals r(t) from their filter outputs. Coefficient adaptive architecture 400 then estimates filter-coefficient asymmetry values and modifies the filter-coefficients to operate at optimal filter-coefficients $G_{k,m}$ values.

It is to be noted that in certain embodiments, during normal mode of operation, i.e. when the OAM receiver 304 is receiving the payload data transmitted on all OAM ±K/2 modes, the controller 302 may be configured to provide the antenna element control signal 334, the phase corrective information signal 336 and the frequency information signal 338 in accordance with the received/detected mobility parameters, practically computed phase constant $\alpha_n$ (e.g. $\alpha_a$, $\alpha_b$) and the coefficient envelope asymmetric value approximately equals to $|\Sigma G_{(-m)} - \Sigma G_{(m)}|$ respectively.

It should be appreciated that variations of the disclosed training/adaptation schemes may be achieved without departing from the overall teachings of the instant disclosure. For example, variations may include the use of other available data to assist/supplement the tasks of selecting the MS antenna output signal, adjusting pseudo-Doppler modulation frequency, confirm the consistency of adjustments based on the training sequences, or intentional biases in the values of the constant-phase adjustments. Such available data may include MS orientation, MS position relative to base station TX, GPS or differential GPS data, timing-advance information in the signal etc.

It should also be appreciated that, in addition to the training and synchronization information, the transmitting BS 302 may also contain various mobility-enabling features for OAM link communications. In concert with the disclosed embodiments, one such feature relates to the beam-steering capabilities of the BS 302, in which beam-steering operations may be configured and directed to maintaining the traveling MS OAM receiver 304 within the footprint of the radiated OAM modes as well as keeping the OAM footprint substantially tangential to a line between the receiving antenna elements associated with the MS OAM receiver 304. For example, the BS 302 may radiate OAM modes that have substantially overlapping footprints based on the transmitting antenna array structure associated with the BS 302. In particular, the BS 302 may employ an arrangement of larger-diameter circular antenna arrays and smaller-diameter circular antenna arrays. As such, the larger-diameter circular antenna arrays may be configured to radiate higher-order OAM modes having suitable element patterns and lower-order modes from concentric, smaller-diameter circular antenna arrays having suitable element patterns.

With regard to antenna array structures, the instant embodiments further disclose the use of circularly-polarized radiating antenna elements for both the BS 302 and the MS OAM receiver 304. That is, the use of circularly-polarized radiating antenna elements in both the BS 302 and the MS OAM receiver 304 mitigates the cross-talk/related interference issues between the received OAM modes that may occur due to an odd-number of ground reflective bounces during link path travel. For example, a single- or odd-number of reflective bounces during path travel transforms a transmitted OAM mode +k into an OAM order −k. In addition, such reflective bounces transform a right (left) hand circularly-polarized (R(L)HCP) wave into a left (right) hand circularly-polarized (L(R)HCP) wave. These mode and polarization transformations caused by ground reflective bounces during path travel may be eliminated or substantially reduced by implementing a receiving antenna polarization structure in the MS OAM receiver 304 that has the same circularly-polarized configuration as the transmitting BS antenna structure, which tends to reject the odd-number reflections.

A person skilled in the art will understand that that the propagation law refers to how rapidly a signal attenuates with distance L from the BS 302, as seen by the MS OAM receiver 304. In the original cellular concept with a high base-station antenna and mobile antenna close to a reflective ground, the reflections tend to combine with the direct signals close to ground so that effectively the composite signal attenuates as $L^4$, hence propagation-law exponent is 4. However, by mitigating reflective bounces for circularly-polarized matching BS 302 and the MS OAM receiver 304, reduces the propagation-law exponent from ~4 to ~2. In so doing, it may compromise the conditions that rely on the propagation exponent ~4 to enable frequency-reuse in conventional cellular coverage models that are based on omni-directional antennas. However, it should be appreciated that, by virtue of the directive nature of the proposed BS transmitting OAM antenna structure and beam-forming/beam-steering features, the frequency-reuse capability may be sufficiently restored by spatially mitigating cross-cell interference. This may be further enabled through the use of the broadcast-type of BS OAM beams in small cells so they can be radiating vertically like lamp lights when using longer wavelengths, or have narrow, steerable "flashlight" types of beams when using very short wavelengths, thereby enabling use of their sidelobe structure to mitigate cross-cell interference.

Figure 10:
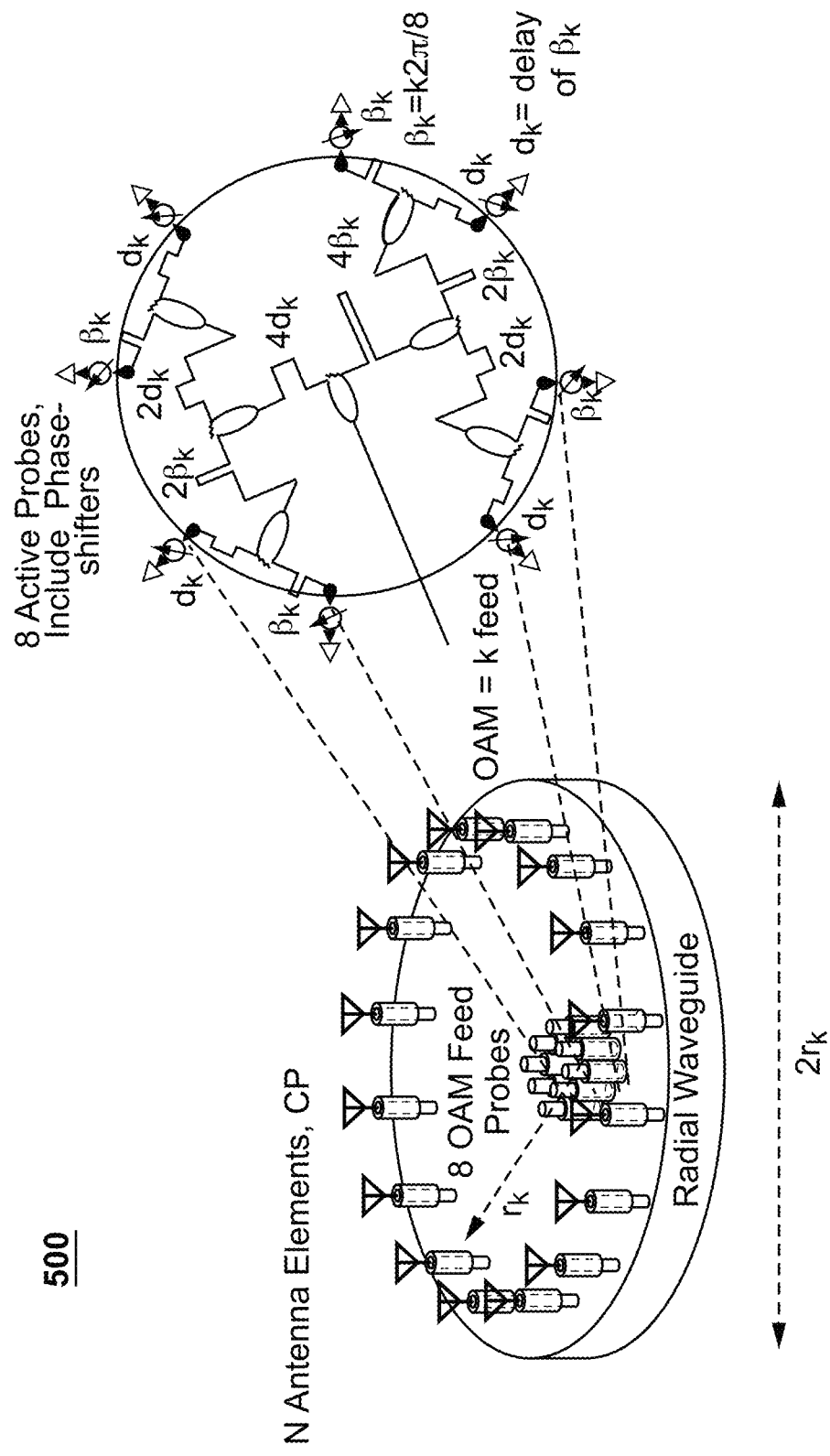
FIG. 10 depicts a transmitting BS antenna array structure, in accordance with the various embodiments of the present disclosure.

FIG. 10 depicts a transmitting BS antenna array structure 500, in accordance with the various embodiments of the present disclosure. It will be appreciated that the antenna array 500 for generating K OAM modes may be quite bulky in terms of radiating elements and hence the use of beam steering phase shifters may further exacerbate the implementation of the antenna array 500. To this end, in certain embodiments, a small number (e.g. 8) of feed probes may be arranged in a circle near the center of a radial waveguide, fed from a small (8×8) modified Butler matrix (discussed below) whose inputs are RF signals carrying the separate data streams corresponding to the OAM modes. In so doing, the beam steering phase shifters may be inserted just at the (8) feed probes. The radial waveguide would extend radially to the aperture size appropriate for narrow or broadcast-type OAM beams, and have any large number of radiating elements coupled at its periphery, spaced about ½ wavelength apart.

With this said, antenna array 500 employs a radial waveguide having a circular-array of K (e.g., 8) feed probes in the center of a radial waveguide. In certain embodiments, the antenna array 500 may also implement N (e.g., 16) circularly-polarized radiating antenna elements (or pick-up probes) disposed at the outer circumferential edge of the radial waveguide. As such, the number of radiating antenna elements N is substantially larger than the number of feed probes/OAM modes K.

The mobile OAM link budget may require the BS antenna to have a radiating aperture size much greater than the size of the feed region occupied by the small number of feed probes and phase-shifters and modified Butler-matrix. Because the radiating elements in such an aperture would still need to be spaced at about half-wavelength intervals and have the appropriate phase excitations required to generate OAM modes, the ensuing large number of elements would necessitate a large number of phase-shifters and ports on the Butler matrix, which would soon become unacceptably lossy and expensive. Hence it is advantageous to use only a small number of feed probes commensurate with the number of OAM modes desired, and use the radial waveguide to distribute the electromagnetic waves carrying the OAM information to the radiating elements in a spatially smooth and efficient manner.

In certain non-limiting embodiments, the far-field amplitude of the k-th OAM mode radiated by the antenna array 500 associated with the BS 302 having radius $r_k$ is proportional to:

$$G_k(\theta, \phi) \approx (-j)^k e^{jk\theta} J_k\left(\frac{2\pi r \sin\phi}{\lambda}\right) \tag{14}$$

where θ is the angle calculated from an axis of the OAM conical beam, θ is the azimuthal angle around the circumference of the antenna array 500 and $J_k(\ )$ is the k-th order Bessel function of the first kind. Using the approximation:

$$\sin(\phi) \approx \frac{R}{L} \tag{15}$$

and the observation that the peaks of the Bessel functions describe the OAM conical beams:

$$\underset{x}{\text{Max}} J_k(x) \approx J_k(k+1) \tag{16}$$

$$x = \frac{2\pi r_k \sin(\phi)}{\lambda} \approx k+1 \tag{17}$$

a person skilled in the art may derive the following approximation from equations (15)-(17):

$$\frac{2\pi r_k R}{\lambda L} \approx k+1 \Rightarrow r_k \approx \frac{(k+1)\lambda L}{2\pi R} \tag{18}$$

Figure 11:
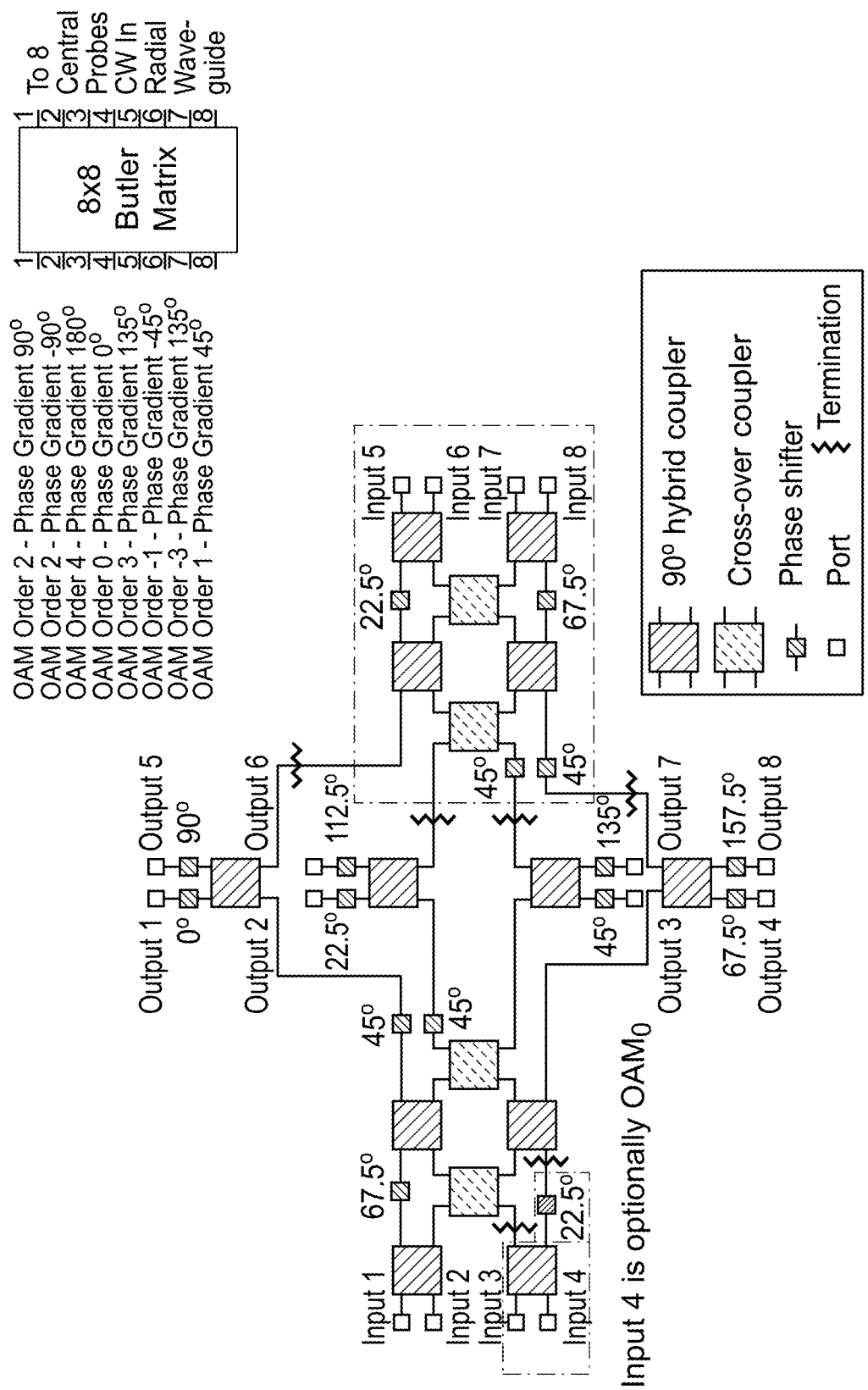
FIG. 11 illustrates a modified butler matrix feed for the antenna array, in accordance with various embodiments of the present disclosure.

However, it will be appreciated that a person skilled in the art will understand that any other suitable method for feeding the OAM modes to the antenna array 500 may be readily devised. For example, FIG. 11 illustrates a modified Butler matrix feed for the antenna array 500, in accordance with various embodiments of the present disclosure. As shown, the modified Butler matrix feed has a planar construction including cross-over couplers and planar hybrids as the standard Butler matrix lacks the phase-continuity modulo 2π between its end outputs.

FIG. 12 provides a listing of representative parameters for a mobile OAM downlink, in accordance with the various embodiments of the present disclosure. As shown, a small cell of practical proportions can be formulated within the constraints imposed by the relationships of the mobile OAM downlink using the present disclosure. Specifically, the independent parameters were selected to have values that are currently practical in the industry, such as channel bandwidth B=20 MHz as in current LTE systems, small-cell link distance from BS 302 L=200 m, a mobile terminal (or user equipment (UE)) including the MS OAM receiver 304 maximum dimension of 20 cm. Such mobile terminal may include a laptop computer, mobile phone, tablets, or the like. A desired capacity increase target of K=5 or about the same order of magnitude as the number of multi input multi output (MIMO) streams advocated in advanced mobile data links (2-8), and a maximum internal pseudo-Doppler modulation frequency in the mobile terminal of F=1 GHz. With some foresight, considering the maximum size of the antenna associated with the BS 302 and the requirement that the mobile terminal operates in its far-field region, the operating RF band was chosen from among the proposed 5G standards as 28 GHz, as highlighted in the table at bottom of FIG. 12.

The relationships particular to the mobile OAM link employing the present disclosure then determined the dependent parameters, in accordance with the relations shown in FIG. 12. Specifically, the minimum distance of the mobile terminal's service area from the OAM beam axis was determined from its relation to bandwidth, mobile terminal antenna separation distance and pseudo-Doppler modulation frequency as R=5 m. The RF operating wavelength was determined by the simple physical relation to the chosen RF operating frequency as λ=1.1 cm. The radius of the largest part of the BS 302 that transmits the highest-order OAM modes was determined from the relationship among the wavelength, link distance and minimum radius from beam axis as being r=20.5 cm, in order to satisfy the requirement of λ/2 spacing among the radiating elements. The maximum number of said elements was then determined, from the same parameters, as N=240, confirming the benefit of having only 8 feed probes and associated transmit hardware in the antenna feed structure instead of 240. It will thus be evident to those skilled in the art that such a link is practically feasible to implement. Further, it will be appreciated that the above configuration is one possible example and should not limit the scope of present technology by any means.

As detailed above, the disclosed embodiments present a pseudo-Doppler MS receiver that employs a three antenna-based configuration to receive, process, and recover OAM modes along the far field that are transmitted by a BS antenna array. The BS antenna array transmits substantially overlapping multiple OAM mode beams for the mobile downlink. Such a configuration enhances the capacity of a given frequency channel by enabling the use of multiple OAM modes to convey payload content.

Figure 13:
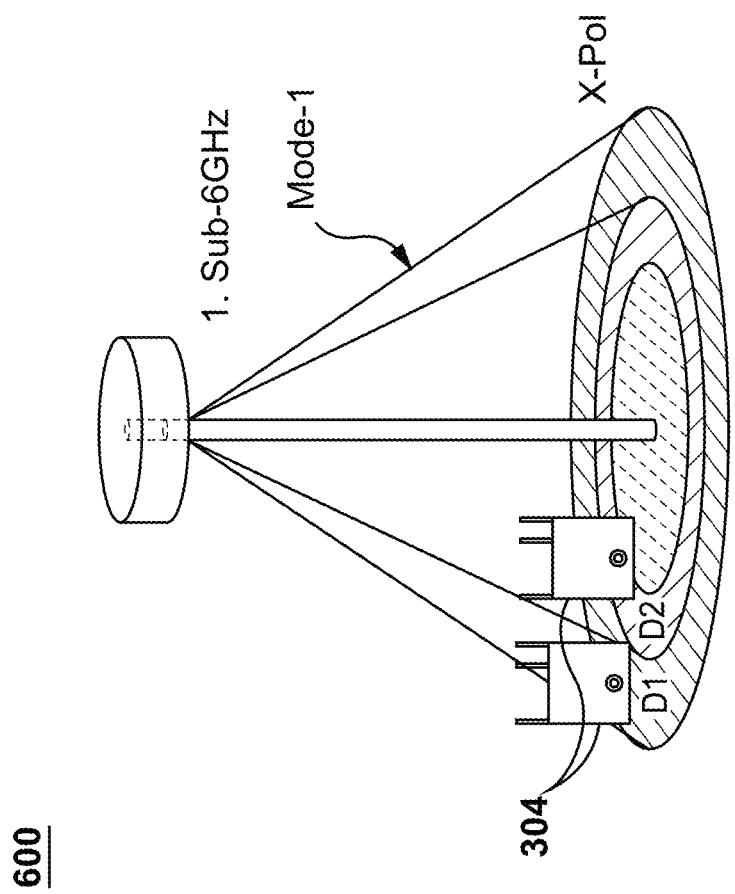
FIG. 13 depicts a representative scenario directed to providing fixed, wide OAM radiations to effect broadcast operations for MSs, in accordance with the various embodiments of the present disclosure.

FIG. 13 illustrates a representative scenario 600 that exploits the features and capabilities consistent with the disclosed embodiments to provide a fixed, wide OAM footprint to effect broadcast operations. As shown, scenario 600 indicates the implementation of a BS/wireless access point (WAP) that is disposed in a strategic location (e.g., a high point of an airport terminal, building lobby, mall complex, hospital, sports arena, etc.) to service multiple MSs. The BS/WAP may be configured to transmit the overlapping OAM modes within a predetermined frequency region (e.g., sub 6 GHz) to provide relatively wide OAM annular footprints that perform broadcasting operations conveying payload content to the MSs within the annular footprint ranges. It will be appreciated that the OAM modes provided by the BS/wireless access point (WAP) may be subdivided into groups serving different types of wireless data receiving units and then segregated based on orthogonal circular polarizations (i.e., RHCP, LHCP).

Figure 14:
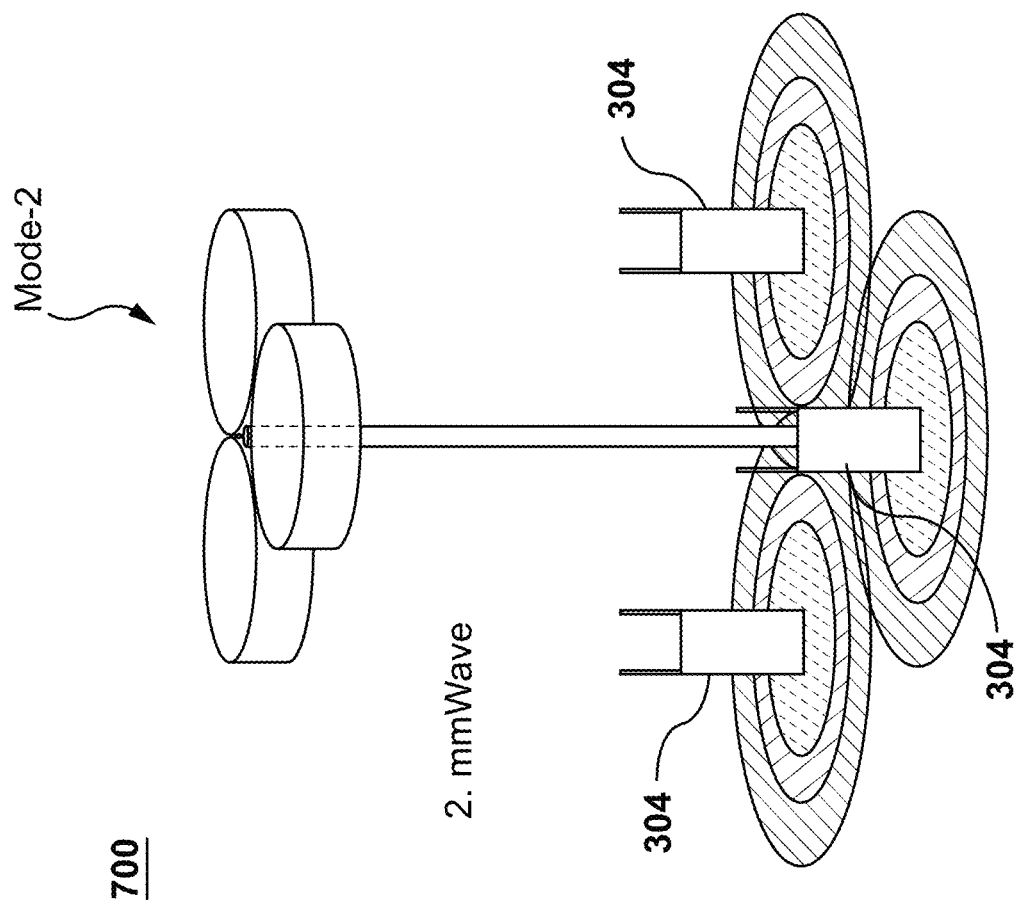
FIG. 14 depicts a representative scenario directed to narrower, steerable OAM radiations capable of covering moving MSs, in accordance with the various embodiments of the present disclosure.

FIG. 14 illustrates another representative scenario 700 that exploits the features and capabilities consistent with the disclosed embodiments to provide narrower, steerable OAM footprints capable of directionally guiding the radiated OAM modes to track and cover moving MSs. Similar to FIG. 13, scenario 700 indicates the implementation of a BS/wireless access point (WAP) that is disposed at a strategic location. The BS/WAP may be configured to add steering phases to the excitations of the transmitted multiple overlapping OAM modes in order to steer the modes towards the moving MSs. These steering phases may be coordinated with reverse-signaling (uplink) information and supplied to the beam-steering processes to direct the OAM modes towards one or more far-field moving MSs.

Figure 15:
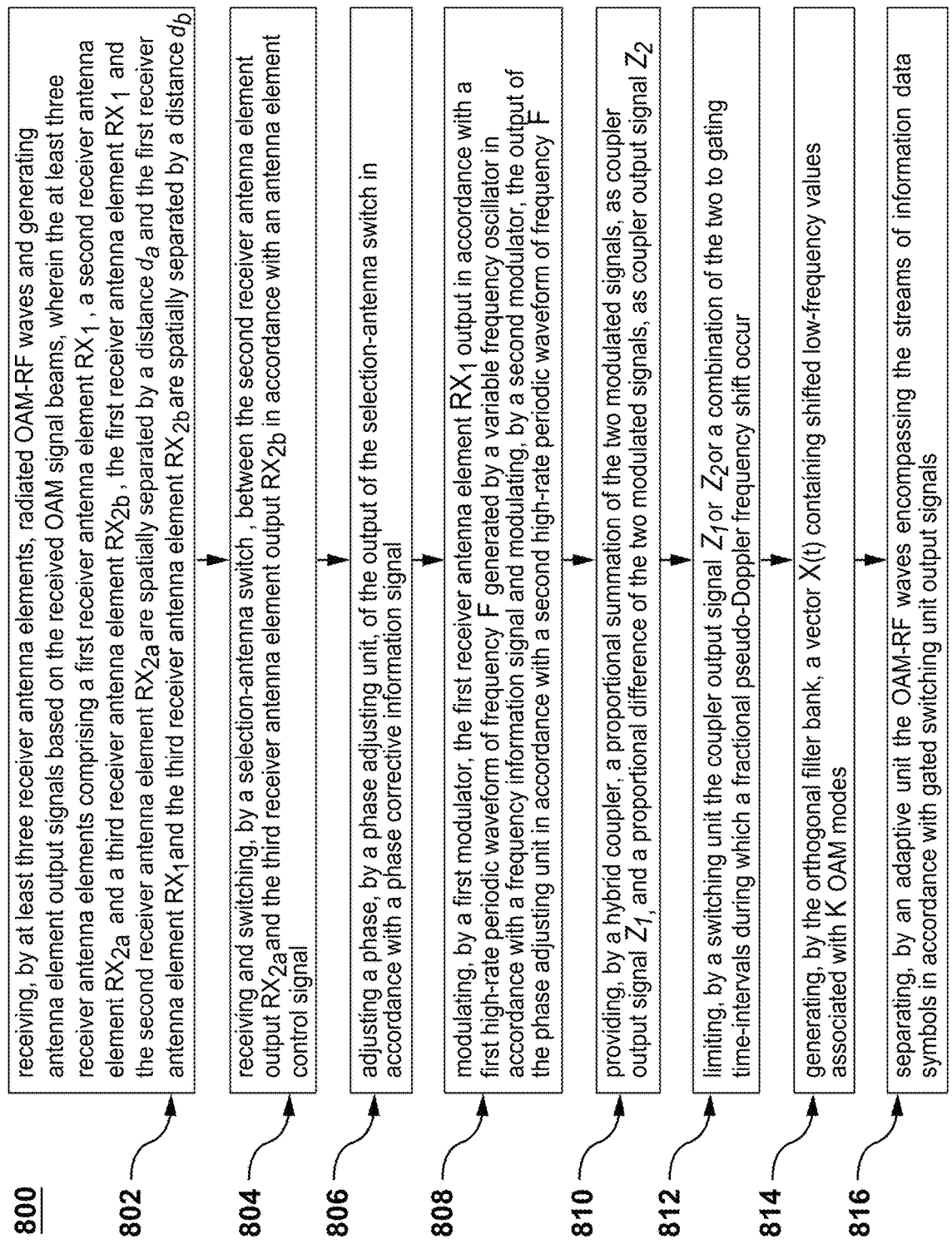
FIG. 15 depicts a flow diagram of a process directed to processing OAM signals, in accordance with various embodiments of the present disclosure.

FIG. 15 depicts a flow diagram of process 800 directed to processing OAM signals, in accordance with various embodiments of the present disclosure. As shown, the process 800 commences at step 802 where the MS OAM receiver 304 is configured to receiving, by at least three receiver antenna elements, radiated OAM-RF waves and generating antenna element output signals based on the received OAM-RF waves, wherein the at least three receiver antenna elements comprising a first receiver antenna element $RX_1$, a second receiver antenna element $RX_{2a}$ and a third antenna element $RX_{2b}$, the first receiver antenna element $RX_1$ and the second receiver antenna element $RX_{2a}$ are spatially separated by a distance $d_a$ and the first receiver antenna element $RX_1$ and the third receiver antenna element $RX_{2b}$ are spatially separated in a substantially orthogonal direction by a distance $d_b$.

As noted above, the MS OAM receiver 304 may be configured to receive the k OAM modes. In particular, the antenna unit 310 associated with the MS OAM receiver 304 incorporates at least three antenna elements $RX_1$, $RX_{2a}$, $RX_{2b}$. The output signals of antenna unit 310 are represented as $W_1$, $W_{2a}$, $W_{2b}$.

The process 800 advances to step 804 where the antenna-selection switch 312 performs receiving and switching between the second receiver antenna element $RX_{2a}$ output and the third receiver antenna element $RX_{2b}$ output in accordance with an antenna element control signal. As discussed above, the antenna-selection switch 312 operates to switch between the signals output by two antenna elements that are not collinear to maximize the diversity between the antenna elements. For example, the depicted embodiment provides that signal $W_{2a}$, output from element $RX_{2a}$, and signal $W_{2b}$, output from element $RX_{2b}$, are supplied to the antenna-selection switch 312. The switching between output signals $W_{2a}$, $W_{2b}$ is driven by an antenna element control signal 334 as supplied by the controller 320.

The process 800 moves to step 806 where the phase adjusting unit 332 preforms adjusting a phase of the output of the antenna-selection switch/312 in accordance with a phase corrective information signal.

The process 800 proceeds to step 808 where, the modulator 314b modulates the first receiver antenna element $RX_1$ output in accordance with a first high-rate periodic waveform of frequency F generated by a variable frequency oscillator in accordance with a frequency information signal. Also, the modulator 314a modulates the output of the phase adjusting unit 332 in accordance with a second high-rate periodic waveform of frequency F such that if the first high-rate periodic waveform is approximately linearly increasing in amplitude then the second high-rate periodic waveform other is simultaneously decreasing in amplitude with time during some common interval within each period, i.e. the gating interval. As previously discussed, the phase adjusted switched output signal $S_k(t)e^{j\psi_2(t)}$ from the phase adjusting unit 332 and the signal $S_k(t)e^{j\psi_1(t)}$ from the antenna element $RX_1$ are supplied to the modulators 314a, 314b, respectively, that operate to multiply the signals with waveforms possessing opposing monotonic amplitude in a manner that at least in some interval (e.g. gating interval) during their period, one of them is approximately linearly increasing in amplitude while the other is simultaneously decreasing in amplitude with time, both the sinusoidal waveforms being operated at the pseudo-Doppler (radian) frequency $\Omega$, where $\Omega=2\pi F$. By way of example waveforms may be a real value cosine signal and a real valued sine signal. However, in certain embodiments, non-sinusoidal modulation waveforms may also be used with a characteristic that one of them is approximately linearly increasing in amplitude while the other is simultaneously decreasing in amplitude with time during some portions of their period.

The process 800 proceeds to step 810 where, the hybrid coupler 316 is configured to provide a proportional summation of the two modulated signals, as coupler output signal $Z_1$, and a proportional difference of the two modulated signals, as coupler output signal $Z_2$. As noted above, the hybrid coupler 316 that operates to provide a proportional summation of the two modulated signals, namely, as coupler output signal $Z_1$, and a proportional difference of the two modulated signals, as coupler output signal $Z_2$. As such, the hybrid coupler 316 outputs signals $Z_1$ and $Z_2$ that respectively contain fractional pseudo-Doppler frequency shift information that is proportional to OAM +k and OAM −k orders.

The process 800 proceeds to step 812, where the switching unit 318 limits the coupler output signal $Z_1$ or $Z_2$ or a combination of the two to gating time-intervals during which the fractional pseudo-Doppler frequency shifts occur. As noted above, the operation of switching unit 318 is controlled by the time-gating unit 324 that is configured to provide a synchronous time-gating function to limit the coupler output signal $Z_1$ (or $Z_2$ or a combination of the two) to the time-intervals of validity when the desired fractional pseudo-Doppler frequency shifts occur.

The process 800 proceeds to step 814, where the orthogonal filter bank 326 generates, a composite vector $X(t)=\Sigma_k X_k(t)$ containing shifted low-frequency values associated with K OAM modes. As previously discussed output of the switching unit 3185 $Z_{1,}(t)=\Sigma_k Z_{1,k}(t)$ represents for the time-gated output for all of the K OAM modes may be supplied to the orthogonal filter bank 326 for further processing. As such, the orthogonal filter bank 326, may be configured to store $N_{FFT}$ samples of the of the time-gated composite output $Z_{1,}(t)=\Sigma_k Z_{1,k}(t)$, generate a vector of the $N_{FFT}$ samples, applying a time window to the vector of the $N_{FFT}$ samples, apply FFT to the time window output, and shifting spectral outputs of the FFT block 364 by modulating the output signals of the FFT block 364 with the high-rate periodic waveform of integer multiples of frequency F to generate baseband signals. The modulation operation may be performed by multiple multiplication elements 460-1 and conjugate multiplication elements 460-2. In certain steps, the multiplication elements 460-1 and 460-2 may be complex multipliers.

Finally at step 816, the adaptive unit 328 separates the OAM-RF waves encompassing the streams of information data symbols in accordance with gated switching unit output signals. As previously discussed, the adaptive unit 328 may be configured to segregate the composite OAM-RF wave comprising of K OAM modes into plurality of OAM-RF waves each comprising single OAM mode.

It is to be understood that the operations and functionality of the OAM based transceiver system 300, constituent components, and associated processes may be achieved by one or more of the hardware-based, software-based, firmware-based elements combinations thereof. Such operational alternatives do not, in any way, limit the scope of the present disclosure.

It will also be understood that, although the inventive concepts and principles presented herein have been described with reference to specific features, structures, and embodiments, it is clear that various modifications and combinations may be made without departing from such disclosures. The specification and drawings are, accordingly, to be regarded simply as an illustration of the inventive concepts and principles as defined by the appended claims, and are contemplated to cover any and all modifications, variations, combinations or equivalents that fall within the scope of the present disclosure.

What is claimed is:

1. An orbital angular momentum (OAM) receiver system, comprising:
at least three receiver antenna elements configured to receive radiated OAM-RF waves and generate antenna element output signals based on the received OAM-RF waves, wherein the at least three receiver antenna elements comprising a first receiver antenna element $RX_1$, a second receiver antenna element $RX_{2a}$ and a third receiver antenna element $RX_{2b}$, the first receiver antenna element $RX_1$ and the second receiver antenna element $RX_{2a}$ are spatially separated by a distance $d_a$ and the first receiver antenna element $RX_1$ and the third receiver antenna element $RX_{2b}$ are spatially separated by a distance $d_b$;
wherein the radiated OAM-RF waves containing superposed order modes in which each of the order modes is denoted by integer k and a total number of superposed modes is denoted by integer K, wherein each of the K modes encompasses an individual stream of information data symbols;
a selection-antenna switch operative to receive, and switch between outputs of, the second receiver antenna element $RX_{2a}$ and the third receiver antenna element $RX_{2b}$ in accordance with an antenna element control signal;
a phase adjusting unit configured to adjust a phase of the output of the selection-antenna switch in accordance with a phase corrective information signal;
a first modulator configured to modulate the first receiver antenna element $RX_1$ output in accordance with a first high-rate periodic waveform of frequency F generated by a variable frequency oscillator in accordance with a frequency information signal and a second modulator configured to modulate the output of the phase adjusting unit in accordance with a second high-rate periodic waveform of frequency F;
a hybrid coupler configured to provide a proportional summation of the two modulated signals, as coupler output signal $Z_1$, and a proportional difference of the two modulated signals, as coupler output signal $Z_2$;
a switching unit configured to limit the coupler output signal $Z_1$ or $Z_2$ or a combination of the two to gating time-intervals during which fractional pseudo-Doppler frequency shifts occur;
an orthogonal filter bank configured to generate a vector $X(t)$ containing shifted low-frequency values associated with all of the K OAM modes; and
an adaptive unit configured to facilitate separation of the OAM-RF waves encompassing the streams of information data symbols in accordance with gated switching unit output signals.

2. The OAM receiver system of claim 1, wherein the frequency F of the high-rate periodic waveform satisfies the relationship: F>2BR/d, where B is the bandwidth of the received OAM signals, R is the radius of the OAM signals and d is either the distance $d_a$ or the distance $d_b$ depending on which receiver antenna element is selected by the selection-antenna switch.

3. The OAM receiver system of claim 1, further comprises passing the modulated, time-gated antenna element output signals through the orthogonal filter bank.

4. The OAM receiver system of claim 3, wherein the orthogonal filter bank further comprises a buffer block configured to:
store $N_{FFT}$ samples of the modulated, time-gated antenna elements output signals, a number of the samples being denoted with integer $N_{FFT}$;
generate the vector X(t) of the $N_{FFT}$ samples of the modulated, time-gated antenna elements output signals.

5. The OAM receiver system of claim 4, further comprising:
applying a time window to the vector of the $N_{FFT}$ samples of the modulated, time-gated antenna elements output signals to generate a time window output; and
applying a Fast-Fourier-Transform (FFT) to the time window output at an FFT block.

6. The OAM receiver system of claim 5, further comprising:
shifting spectral outputs of the FFT block by modulating the output signals of the FFT block with the high-rate periodic waveform of frequency F to generate baseband signals; and
further multiplying the baseband signals by adapted weighting coefficients and summing up to provide separate k-th OAM mode baseband signals.

7. The OAM receiver system of claim 6, wherein the adapted weighting coefficients are generated in accordance with one of the following algorithms:
LMS algorithm;
Recursive Least Squares (RLS) algorithm;
Newton-LMS algorithm;
Jutten-Herault network.

8. The OAM receiver system of claim 7, further comprising generating adapted weighting coefficients by determining an error signal by subtracting the separate k-th OAM mode baseband signals from a reference signal received on the first receiver antenna element $RX_1$ and multiplying the error signal by the spectral outputs of the FFT block.

9. The OAM receiver system of claim 1, wherein the adaptive unit is configured to generate an asymmetry parameter associated with each k-th OAM mode signal.

10. The OAM receiver system of claim 9, further comprises a parameter analyzer configured to analyze the asymmetry parameter and mobility parameters associated with the OAM receiver system and generate controlling signals.

11. The OAM receiver system of claim 10, further comprises a controller configured to generate one or more of:
the antenna element control signal in accordance the controlling signals associated with the mobility parameters;
the phase corrective information signal in accordance the controlling signals associated with phases of the received radiated OAM-RF waves; and
the frequency information signal in accordance the controlling signals associated with the asymmetry parameter.

12. The OAM receiver system of claim 1, further comprises a synchronous time-gating unit that is controlled by the high-rate periodic waveform of frequency F.

13. The OAM receiver system of claim 1, wherein the received radiated OAM-RF waves have been generated in a beam steering manner.

14. The OAM receiver system of claim 1, wherein:
if the first high-rate periodic waveform is increasing in amplitude then the second high-rate periodic waveform other is simultaneously decreasing in amplitude during gating time-intervals; and
if the second high-rate periodic waveform is increasing in amplitude then the first high-rate periodic waveform other is simultaneously decreasing in amplitude during gating time-intervals.

15. The OAM receiver system of claim 1, wherein the first high-rate periodic waveform and the second are real valued cosine waveform and real valued sine waveforms respectively.

16. A method for processing orbital angular momentum (OAM) signals, comprising:
receiving, by at least three receiver antenna elements, radiated OAM-RF waves and generating antenna element output signals based on the received OAM-RF waves, wherein the at least three receiver antenna elements comprising a first receiver antenna element $RX_1$, a second receiver antenna element $RX_{2a}$ and a third antenna element $RX_{2b}$, the first receiver antenna element $RX_1$ and the second receiver antenna element $RX_{2a}$ are spatially separated by a distance $d_a$ and the first receiver antenna element $RX_1$ and the third receiver antenna element $RX_{2b}$ are spatially separated by a distance $d_b$;
the radiated OAM-RF waves containing superposed order modes in which each of the order modes is denoted by integer k and a total number of superposed modes is denoted by integer K, wherein each of the K modes encompasses an individual stream of information data symbols;
receiving and switching, by a selection-antenna switch, between the second receiver antenna element $RX_{2a}$ output and the third receiver antenna element $RX_{2b}$ output in accordance with an antenna element control signal;
adjusting a phase, by a phase adjusting unit, of the output of the selection-antenna switch in accordance with a phase corrective information signal;
modulating, by a first modulator, the first receiver antenna element $RX_1$ output in accordance with a first high-rate periodic waveform of frequency F generated by a variable frequency oscillator in accordance with a frequency information signal and modulating, by a second modulator, the output of the phase adjusting unit in accordance with a second high-rate periodic waveform of frequency F;
providing, by a hybrid coupler, a proportional summation of the two modulated signals, as coupler output signal $Z_1$, and a proportional difference of the two modulated signals, as coupler output signal $Z_2$;
limiting, by a switching unit, the coupler output signal $Z_1$ or $Z_2$ or a combination of the two to gating time-intervals during which a fractional pseudo-Doppler frequency shift occur;
generating, by an orthogonal filter bank, a vector X(t) containing shifted low-frequency values associated with all of the K OAM modes; and
separating, by an adaptive unit the OAM-RF waves encompassing the streams of information data symbols in accordance with gated switching unit output signals.

17. The method of claim 16, wherein the frequency F of the high-rate periodic waveform satisfies the relationship: F>2BR/d, where B is the bandwidth of the received OAM signals, R is the radius of the OAM signals and d is either the distance $d_a$ or the distance $d_b$ depending on which receiver antenna element is selected by the selection-antenna switch.

18. The method of claim 16, further comprises passing the modulated, time-gated antenna element output signals through the orthogonal filter bank.

19. The method of claim 18, wherein the orthogonal filter bank further comprises a buffer block is configured to:
   store $N_{FFT}$ samples of the modulated, time-gated antenna element output signals, a number of the samples being denoted with integer $N_{FFT}$;
   generate the vector X(t) of the $N_{FFT}$ samples of the modulated, time-gated antenna element output signals.

20. The method of claim 19, further comprising:
   applying a time window to the vector of the $N_{FFT}$ samples of the modulated, time-gated antenna element output signals to generate a time window output; and
   applying a Fast-Fourier-Transform (FFT) to the time window output at an FFT block.

21. The method of claim 20, further comprising:
   shifting spectral outputs of the FFT block by modulating the output signals of the FFT block with the high-rate periodic waveforms of frequencies equal to integer multiples of F to generate baseband signals; and
   further multiplying the baseband signals by adapted weighting coefficients and summing up to provide separate k-th OAM mode baseband signals.

22. The method of claim 21, wherein the adapted weighting coefficients are generated in accordance with one of the following algorithms:
   LMS algorithm;
   Recursive Least Squares (RLS) algorithm;
   Newton-LMS algorithm;
   Jutten-Herault network.

23. The method of claim 22, further comprising generating adapted weighting coefficients by determining an error signal by subtracting the separate k-th OAM mode baseband signals from a reference signal received on the first receiver antenna element $RX_1$ and multiplying the error signal by the spectral outputs of the FFT block.

24. The method of claim 16, wherein the adaptive unit is configured to generate an asymmetry parameter associated with each k-th OAM mode signal.

25. The method of claim 24, further comprises a parameter analyzer configured to analyze the asymmetry parameter and mobility parameters associated with the OAM receiver system and generate controlling signals.

26. The method of claim 25, further comprises a controller configured to generate one or more of:
   the antenna element control signal in accordance the controlling signals associated with the mobility parameters;
   the phase corrective information signal in accordance the controlling signals associated with phases of the received radiated OAM-RF waves; and
   the frequency information signal in accordance the controlling signals associated with the asymmetry parameter.

27. The method of claim 16, further comprises a synchronous time-gating unit that is controlled by the high-rate periodic waveform of frequency F.

28. The method of claim 16, wherein the received radiated OAM-RF waves have been generated in a beam steering manner.

29. The method of claim 16, wherein:
   if the first high-rate periodic waveform is increasing in amplitude then the second high-rate periodic waveform other is simultaneously decreasing in amplitude during gating time-intervals; and
   if the second high-rate periodic waveform is increasing in amplitude then the first high-rate periodic waveform other is simultaneously decreasing in amplitude during gating time-intervals.

30. The method of claim 16, wherein the first high-rate periodic waveform and the second high-rate waveform of frequency F are real valued cosine waveform and real valued sine waveforms respectively.

\* \* \* \* \*